United States Patent [19]

Ohno

[11] Patent Number: 5,745,302
[45] Date of Patent: Apr. 28, 1998

[54] INVERTED GALILEAN TYPE ZOOM FINDER LENS SYSTEM

[75] Inventor: Kazunori Ohno, Saitama, Japan

[73] Assignee: Fuji Photo Optical Co., Ltd., Saitama, Japan

[21] Appl. No.: 829,821

[22] Filed: Mar. 25, 1997

[51] Int. Cl.$^6$ .......................... G02B 15/14; G02B 17/08; G03B 13/02
[52] U.S. Cl. .......................... 359/689; 359/731; 396/379
[58] Field of Search .......................... 359/689, 676, 359/731; 396/379

[56] References Cited

U.S. PATENT DOCUMENTS

| | | | |
|---|---|---|---|
| 4,256,396 | 3/1981 | Kawaguchi et al. | 359/672 |
| 4,650,293 | 3/1987 | Kimura et al. | 359/744 |
| 5,086,353 | 2/1992 | Mukai et al. | 359/643 |

*Primary Examiner*—Scott J. Sugarman
*Attorney, Agent, or Firm*—Young & Thompson

[57] ABSTRACT

An inverted Galilean zoom view finder equipped with a framing mark projection feature comprises in order from the object side to the image side a positive power objective lens $L_1$ which is a by-convex singlet having a strong curvature of object side surface, a negative power lens $L_2$ which is a by-concave singlet having a strong curvature of image side surface, and a negative power eye piece lens $L_3$ which is a meniscus singlet having a strong curvature of concave surface at the object side. The negative power lens $L_2$ is movable relative to both positive power objective lens $L_1$ and negative power eye piece lens $L_3$ along the optical axis X to vary the magnitude of the finder lens system, and the eye piece lens is formed with a reflective surface around a half transparent surface at the image side for reflecting back an image of framing mark and directing the image into the view of the zoom view finder.

24 Claims, 20 Drawing Sheets

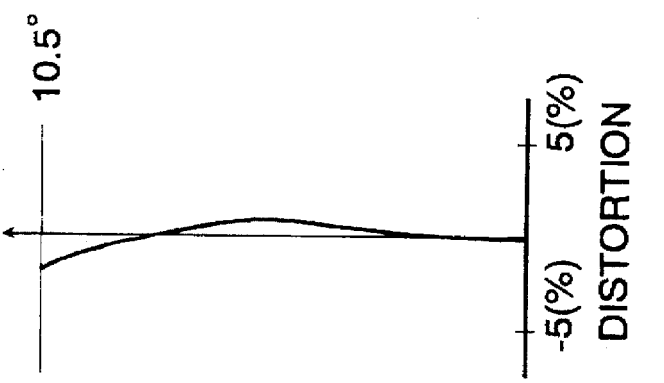
FIG. 5C (MIDDLE POSITION)
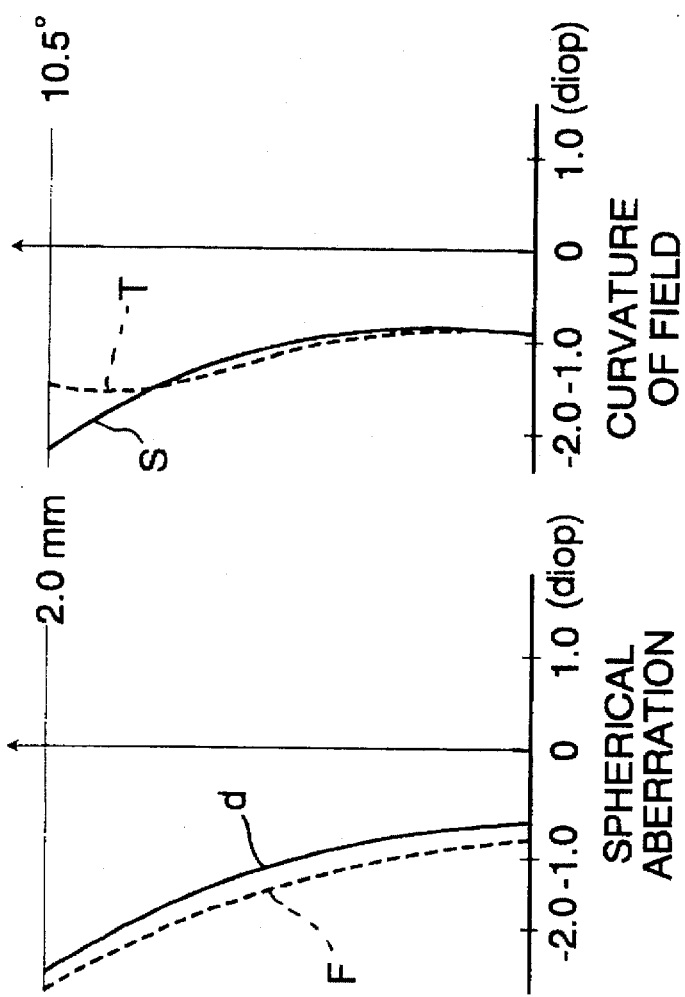
FIG. 5B (MIDDLE POSITION)
FIG. 5A (MIDDLE POSITION)

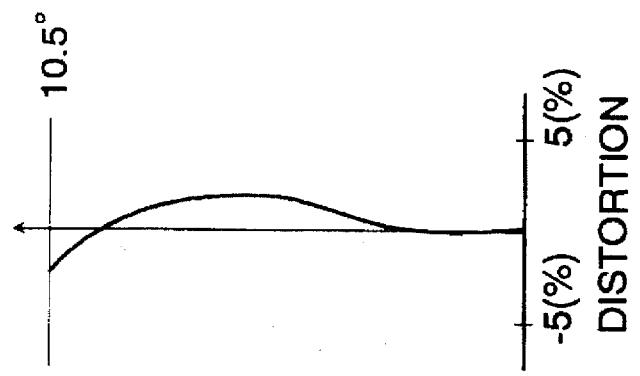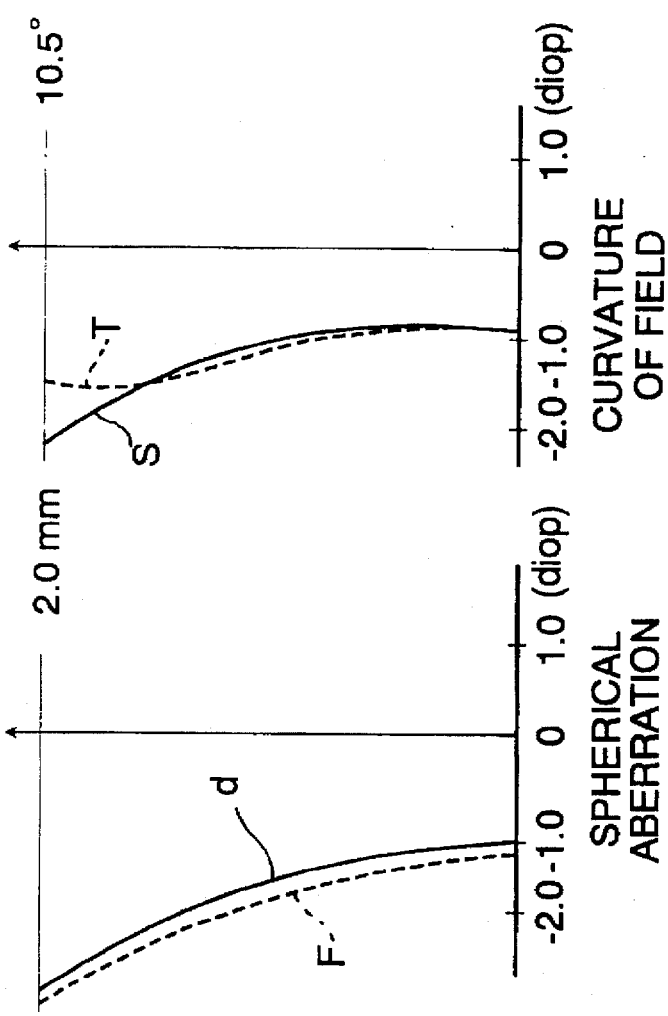

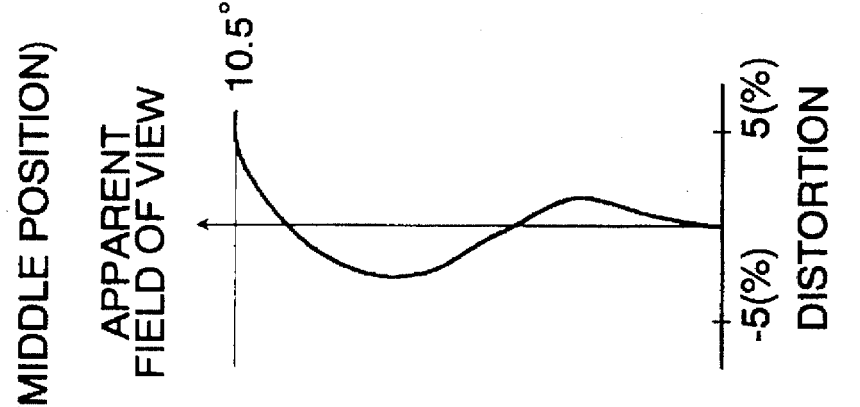
FIG. 8C
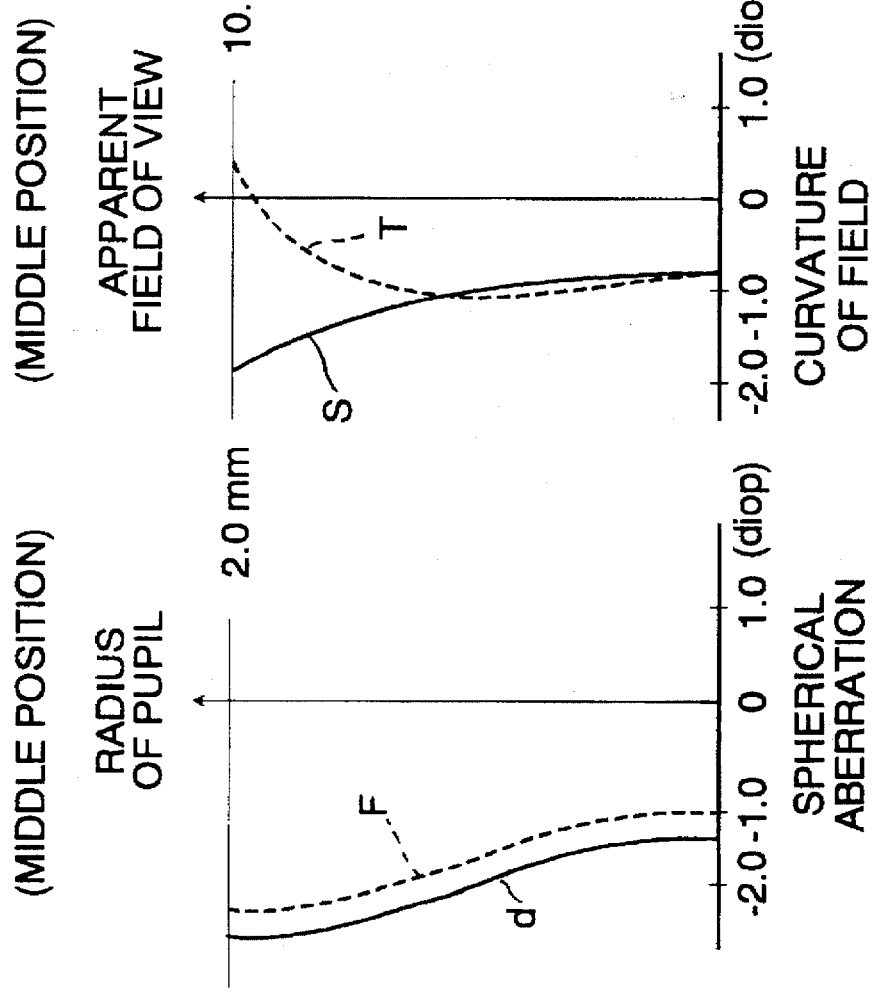
FIG. 8B
FIG. 8A

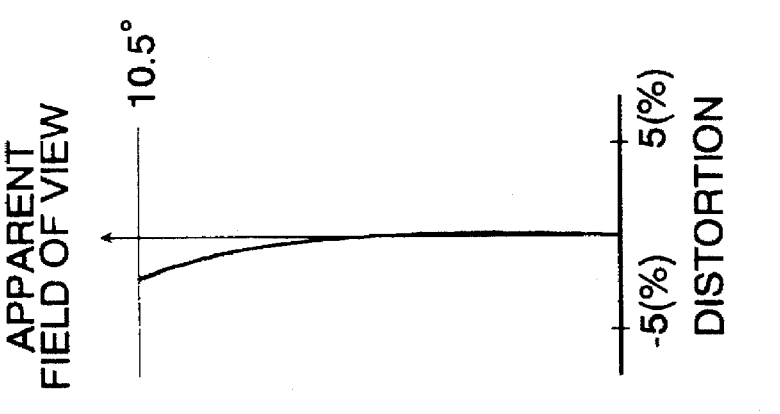
FIG. 9C (TELEPHOTO END)
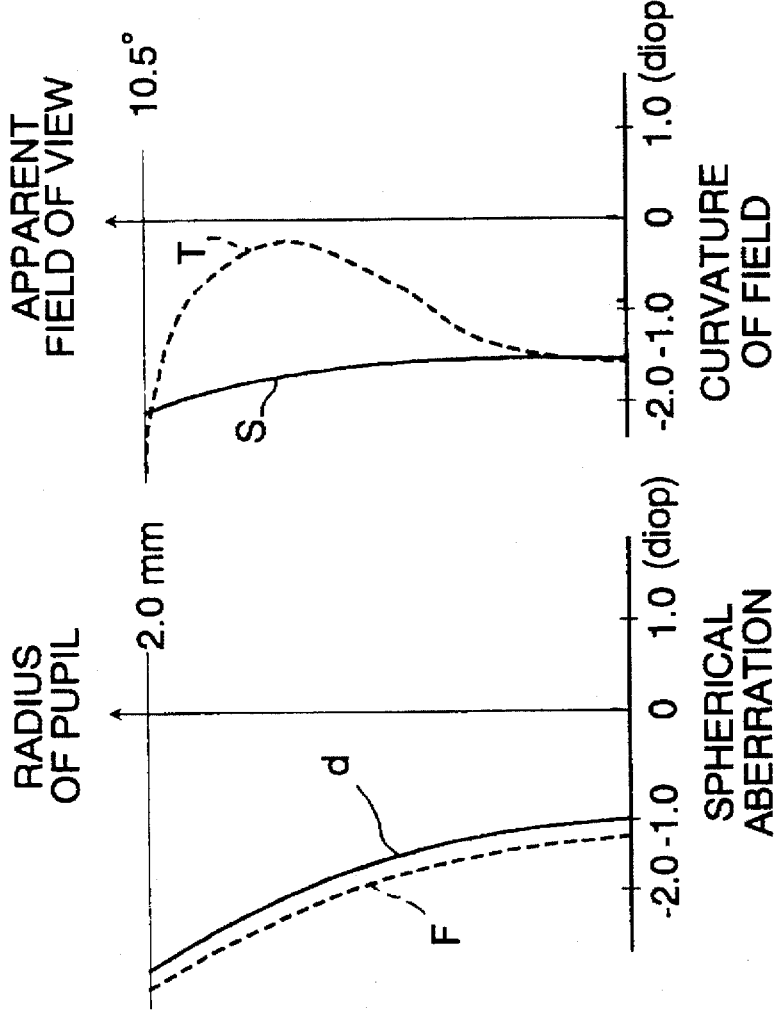
FIG. 9B (TELEPHOTO END)
FIG. 9A (TELEPHOTO END)

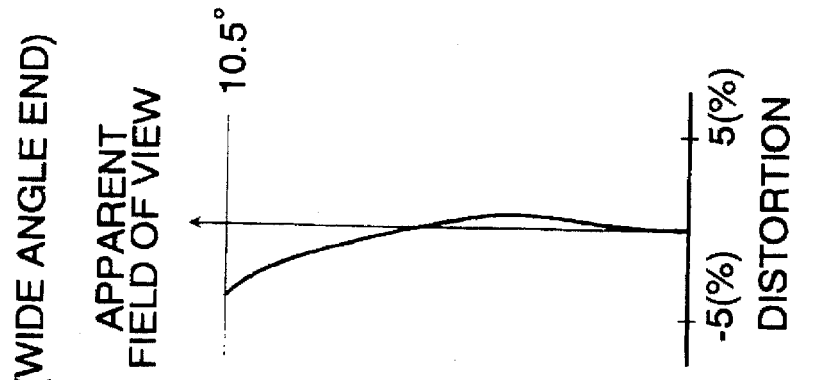
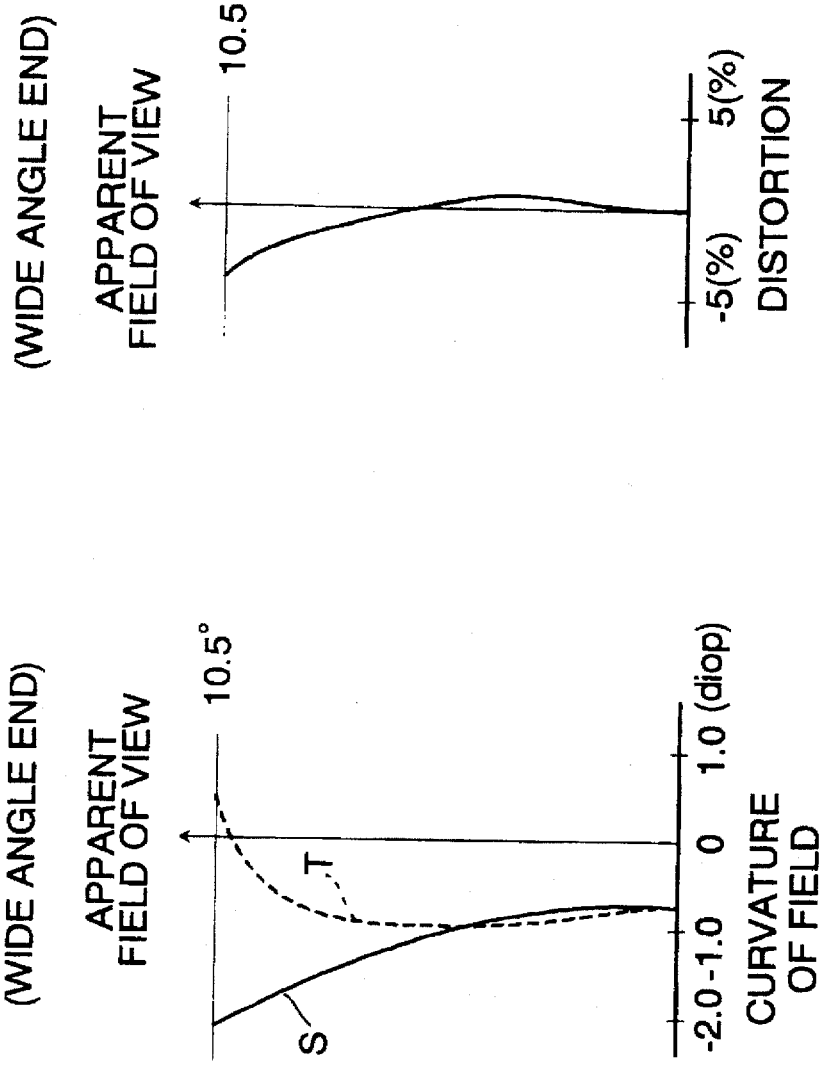
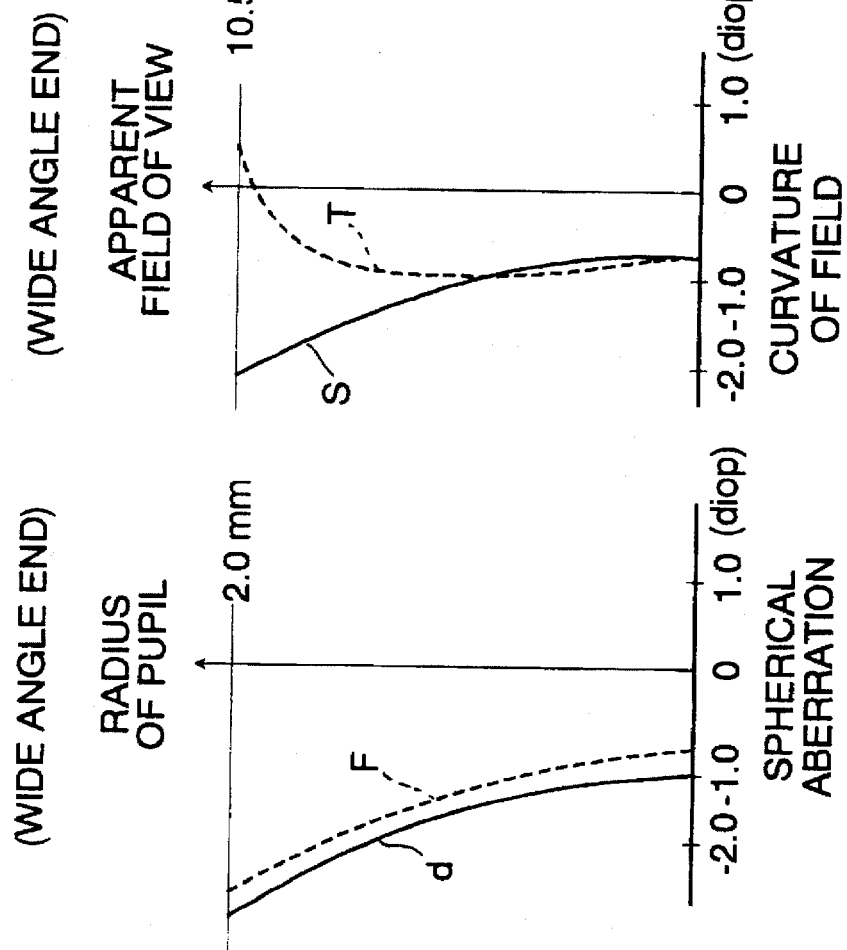

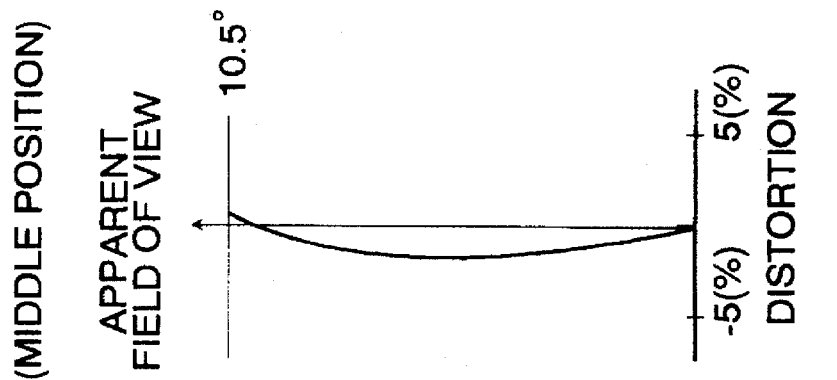
FIG. 11C
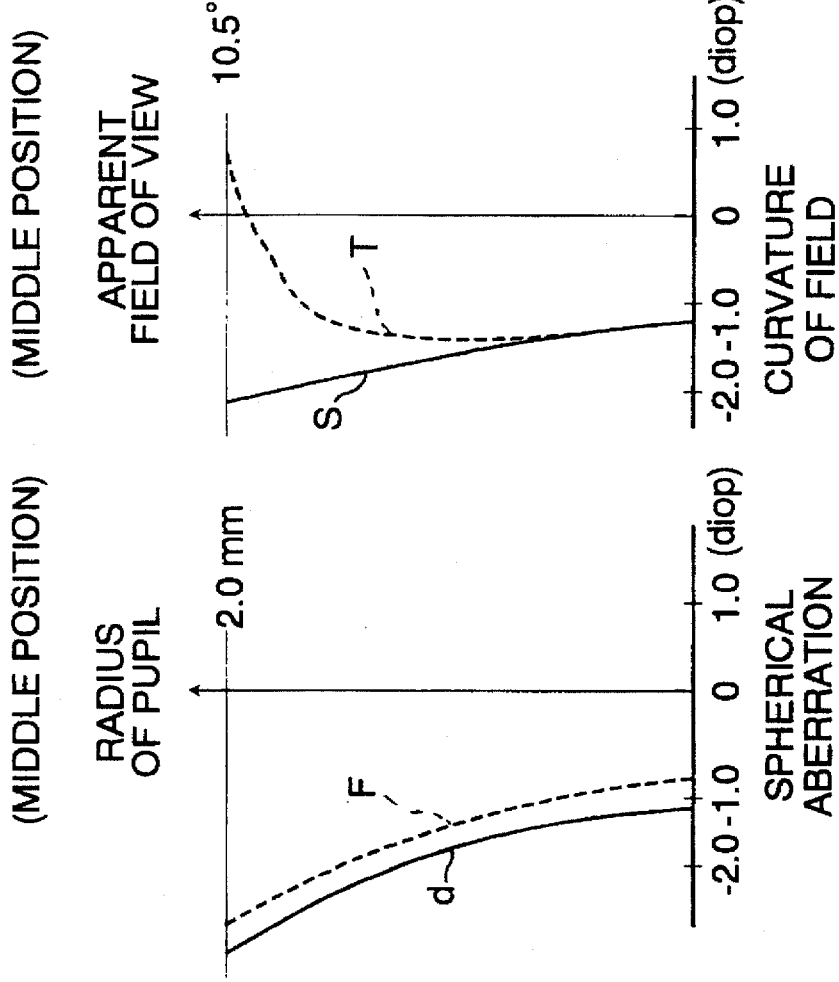
FIG. 11B
FIG. 11A

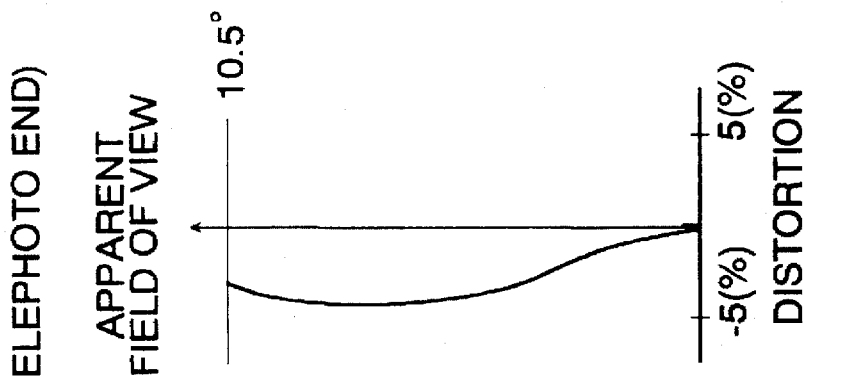
FIG. 12C (TELEPHOTO END)
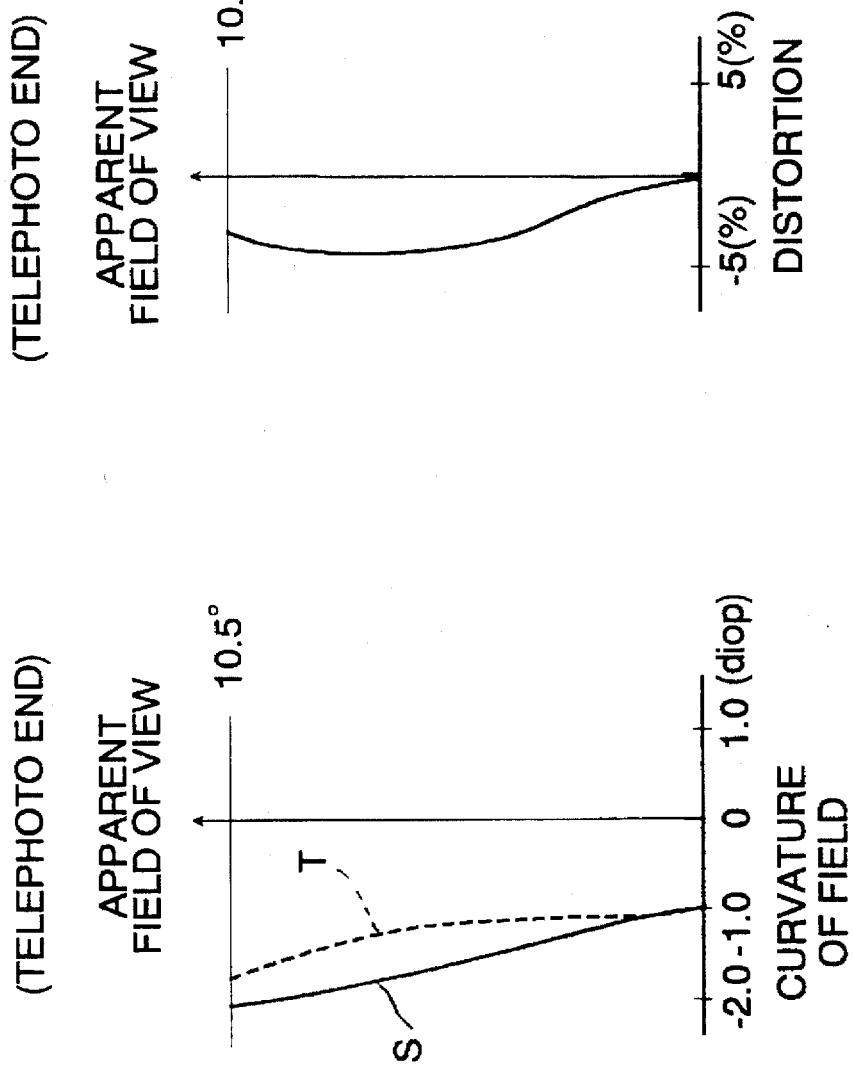
FIG. 12B (TELEPHOTO END)
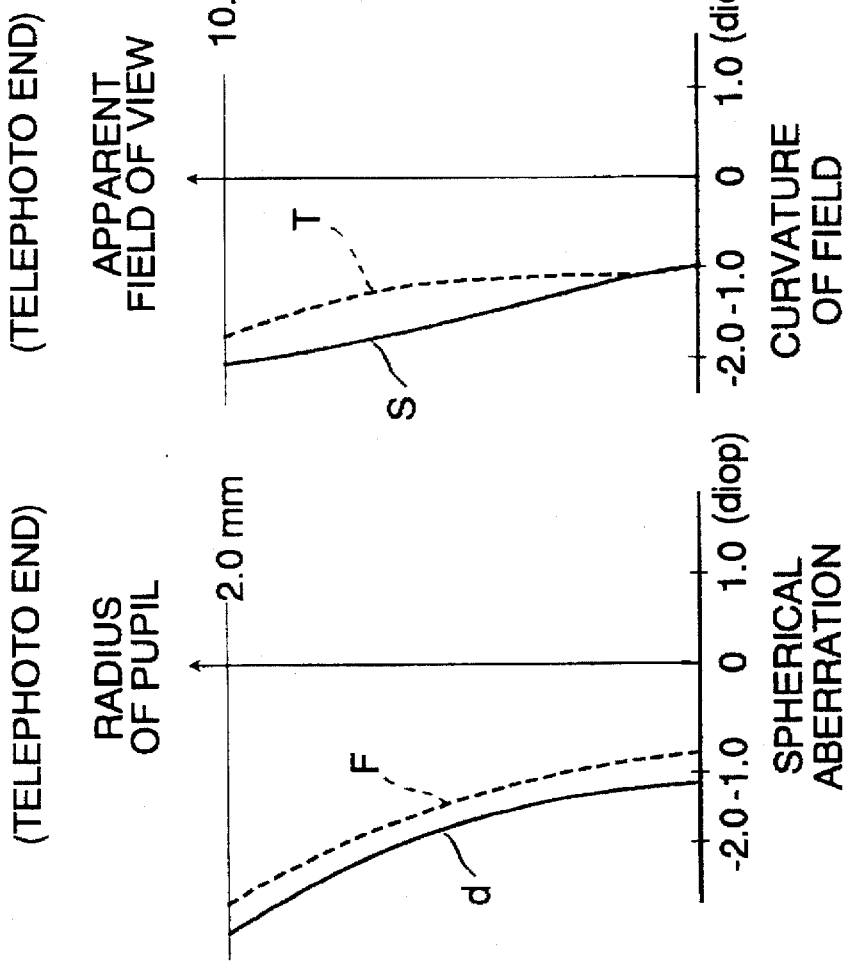
FIG. 12A (TELEPHOTO END)

INVERTED GALILEAN TYPE ZOOM FINDER LENS SYSTEM

BACKGROUND OF THE INVENTION

1. Field of the Invention

This invention relates to a zoom view finder optical system for compact still cameras such as, in particular, conventional cameras and electronic still cameras.

2. Description of Related Art

With improvement cameras with various types of zoom lenses, various types of zoom view finders have been developed. In recent years, in order to meet a strong demand for miniaturization of cameras, such a zoom view finder is in need of having a space saving construction. While a real image type of zoom view finder having an electing optical system is suitable for compact cameras, various constraints are imposed on production costs, which are always undesirable for low-priced compact cameras for popular use. For this reason, there is a strong demand for inexpensive and space saving zoom view finders for compact cameras.

One of inexpensive zoom view finders which is widely spreaded is an Albada type of inverted Galilean zoom view finder made up four lens elements such as known in, for example, Japanese Unexamined Patent Publication No. 2-116811. One of the problems that this Albada type inverted Galilean zoom view finder encounters is a relatively large overall length and a large diameter of objective lens. This is because the Albada type inverted Galilean zoom view finder includes at least two optical elements, namely a framing mark reticle disposed closely to an eye piece lens of the view finder and a stationary half transparent lens as an optical system for reflecting into the view finder a framing mark showing the field of view, these two optical elements having to be separated at a specific distance. Consequently, the Albada type inverted Galilean zoom view finder is not always regarded to be suitable for compact cameras. Another one of inexpensive zoom view finders taught by, for example, Japanese Unexamined Patent Publication No. 63-158516 is of a type consisting of three lens elements which include an eye piece lens having a half transparent surface at 45° with respect to the view finder optical axis owing to the configuration of the eye piece lens, the view finder has a large depth in a direction of the optical axis of the camera without fail, and hence it is hard to provide the overall compactness of the view finder and to be produced at low costs zoom view finders of a type which does not project a framing mark into the view finder have been proposed in, for example, Japanese Unexamined Patent Publications Nos. 61-160712 and 61-167918. Such a zoom view finder needs to include at least two movable lens groups and, if a framing mark projection function is installed, it is inevitable that the zoom view finder has a large overall optical length. A camera with this type of zoom view finder is make bulky.

SUMMARY OF THE INVENTION

It is accordingly an object of the invention to provide a zoom view finder optical system capable of projecting a framing mark showing the field of view into the view which is installed favorably in compact cameras.

The foregoing object of the invention is accomplished according to the principle of the present invention by providing a zoom view finder optical system (which are hereafter referred to as a finder lens system) comprising three component lens elements, namely, in order from the object side to the image side, a positive power objective lens $L_1$, a negative power lens $L_2$, and a negative power eye piece lens $L_3$. Specifically, the objective lens $L_1$ is a by-convex singlet having a strong curvature of object side surface, the negative power lens $L_2$ is a by-concave singlet having a strong curvature of image side surface, and the eye piece lens $L_3$ is a meniscus singlet having a strong curvature of concave surface at the object side. The negative power lens $L_2$ is movable relative to both positive power objective lens $L_1$ and negative power eye piece lens $L_3$ along the optical axis X to vary the magnitude of the finder lens system. The finder lens system is designed and adapted to focus light rays in parallel to the optical axis X at an eye point E.P. always even during zooming.

Letting $R_5$, $R_6$ and $d_5$ be the radius of paraxial curvature of the object side surface of the eye piece lens, the radius of paraxial curvature of the image side surface of the eye piece lens $L_3$, and the axial distance between the object side surface and the image side surface of the eye piece lens $L_3$, respectively, the finder lens system satisfies the following conditions:

$$0.6 < R_5/R_6 < 0.9$$

$$-1.8 < d_5/R_5 < -1.4$$

The finder lens system may have a half transparent surface on at least part of the object side surface of the eye piece lens $L_3$ and a reflective surface around an area of the image side surface of the eye piece lens $L_3$ within the effective visual field which is specified by visual field light rays. This reflective surface preferably is a spherical surface having its center of curvature on the optical axis, or otherwise an asperical surface having its center of curvature on the optical axis. The finder lens system may further have a reticle of information indicating a boundary of the effective visual field on the image surface of the eye piece lens $L_3$. It is preferred for the finder lens system to have at least two reflective surfaces on the eye piece lens $L_3$ by which light lays passed through the reticle or somewhere near the reticle are internally reflected. The incident surface of the eye piece lens element which light rays passed through the reticle or somewhere near the reticle, or the incident surface of an optical element disposed between these reticle and eye piece lens element which light rays passed through the reticle enter preferably functions as a dioptric lens surface relative to the reticle.

BRIEF DESCRIPTION OF THE DRAWINGS

The above and other objects and features of the present invention will be understood from the following description of a specific embodiment thereof when considering in conjunction with the accompanying drawings, in which:

FIGS. 5A, 5B and 5C are diagrams showing aberrations at an intermediate position between the wide angle end and telephoto end of the zoom view finder optical system of FIG. 1;

FIGS. 6A, 6B and 6C are diagrams showing aberrations at the telephoto end of the zoom view finder optical system of FIG. 1;

FIGS. 8A, 8B and 8C are diagrams showing aberrations at an intermediate position between the wide angle end and telephoto end of the zoom view finder optical system of FIG. 2;

FIGS. 9A, 9B and 9C are diagrams showing aberrations at the telephoto end of the zoom view finder optical system of FIG. 2;

FIGS. 10A, 10B and 10C are diagrams showing aberrations at the wide angle end of the zoom view finder optical system of FIG. 3;

FIGS. 11A, 11B and 11C are diagrams showing aberrations at an intermediate position between the wide angle end and telephoto end of the zoom view finder optical system of FIG. 3;

FIGS. 12A, 12B and 12C are diagrams showing aberrations at the telephoto end of the zoom view finder optical system of FIG. 3;

DETAILED DESCRIPTION OF THE SPECIFIC EMBODIMENT

Figure 1A:
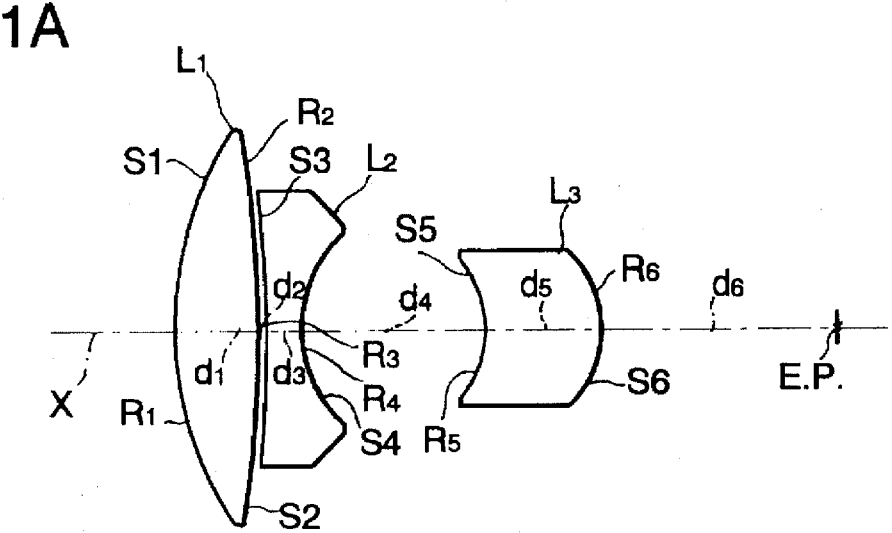
FIG. 1A is a diagrammatic side view of a zoom view finder optical system in accordance with an embodiment of the invention which is at the wide angle end.

A finder lens system embodying the invention comprises three lens elements, namely, in order from the object side to the image side, a positive power objective lens $L_1$, a negative power lens $L_2$, and a negative power eye piece lens $L_3$. Specifically, the objective lens $L_1$ is a by-convex singlet having a strong curvature of object side surface S1, The negative power lens $L_2$ is a by-concave singlet having a strong curvature of image side surface S4, and the eye piece lens $L_3$ is a meniscus singlet having a strong curvature of concave surface S5 at the object side. The negative power lens $L_2$ is movable relative to the positive power objective lens $L_1$ and the negative power eye piece lens $L_3$ along the optical axis X to vary the magnitude of the finder lens system. The finder lens system is designed and adapted to focus light rays in parallel to the optical axis X at the eye point E.P. always even during zooming.

Letting $R_5$, $R_6$ and $d_5$ be the radius of paraxial curvature of the object side surface S5 of the eye piece lens $L_3$, the radius of paraxial curvature of the image side surface S6 of the eye piece lens $L_3$, and the axial distance between the object side surface S5 and the image side surface S6 of the eye piece lens $L_3$, respectively, the finder lens system satisfies the following conditions:

$$0.6 < R_5/R_6 < 0.9 \qquad (1)$$

$$-1.8 < d_5/R_5 < -1.4 \qquad (2)$$

The finder lens system may have a half transparent surface on at least part of the object side surface S5 of the eye piece lens $L_3$ and a reflective surface around an area of the image side surface S6 of the eye piece lens $L_3$ within the effective visual field which is specified by visual field light rays. This reflective surface preferably may be a spherical surface having its center of curvature on the optical axis, or otherwise an aspherical surface having its center of curvature on the optical axis. The aspherical surface may be defined by the following equation:

$$Z = Ch^2/\{1+(1-KC^2h^2)^{1/2}\}+a_2h^4+a_3h^6+a_4h^8+a_5h^{10}$$

where Z is the surface sag at a semi-aperture distance h from the axis X of the finder lens system;

C is the paraxial curvature of a lens surface at the optical axis X;

K is a conic constant; and $a_2$, $a_3$, $a_4$ and $a_5$ are aspherical coefficients.

The finder lens system may further have a reticle of information indicating a boundary of the effective visual field on the image side surface S6 of the eye piece lens $L_3$. It is preferred for the finder lens system to have at least two reflective surfaces on the eye piece lens $L_3$ by which light rays passed through the reticle or somewhere near the reticle are internally reflected. The surface of the eye piece lens $L_3$ which light rays passing through the reticle or somewhere near the reticle enter, or the surface of an optical element disposed between these reticle and eye piece lens $L_3$ which light rays passing through the reticle enter preferably functions as a dioptric lens surface.

By bringing the object focal point of the eye piece lens $L_3$ close to the eye point E.P. by means of forming the eye piece lens $L_3$ with a strong curvature of concave object side surface S5, the distance of the object focal point of the eye piece lens $L_3$ to the resultant focal point of the positive power objective lens $L_1$ and the negative power lens $L_2$ is made shorter, and hence the axial distance of movement of the negative power lens $L_2$ between the wide angle end and the telephoto end is made shorter, which provides the overall compactness of the finder lens system.

The parameters set forth are necessary for suitable balancing the aberrations of the finder lens system. Together, the conditions prevent or significantly reduce an increase in divergent angle of light rays bearing the image of framing mark at a plane perpendicular to the optical axis of the eye piece lens $L_3$.

The first parameter $(0.6 < R_5/R_6 < 0.9)$ defines the ratio between the radii of paraxial curvature of the surfaces of the eye piece lens $L_3$. If the lower limit of the first parameter is exceeded, while the eye piece lens $L_3$ is configured as a positive meniscus element having a strong power, and hence the finder lens system is enabled to be more compact, nevertheless, both objective lens $L_1$ and movable lens $L_2$ have to have enhanced strong power, respectively, in addition to that the eye piece lens $L_3$ has to have a too strong curvature on the object side surface S5. This causes aggravation of optical performances, in particular spherical aberrations, the curvature of field, and distortion, which are incorrective even by the utilization of aspheric surfaces. Further, in the case where the eye piece lens $L_3$ is provided with a half transparent coating on the object side surface S5 to project a framing mark showing the field of view, the reflective angle of the half transparent surface is too large to restrain light rays bearing the image of framing mark from increasing in divergent angle at a plane perpendicular to the optical axis of the eye piece lens $L_3$. On the other hand, if the upper limit of the first parameter is exceeded, the eye piece lens $L_3$ makes the radius of curvature of the object side surface S5 too large, and hence makes its object focal point separate far from the eye point E.P., increasing the axial distance between the movable lens $L_2$ and the eye piece lens $L_3$, which is always undesirable for the overall compactness of the finder lens system. Furthermore, the large radius of curvature of the object side surface S5 makes the distance between light beams bearing the image of framing mark and light rays bearing an object image too short to dispose the reticle of framing mark sufficiently far from the optical axis of the finder lens system.

The second parameter $(-1.8 < d_5/R_5 < -1.4)$ defines the ratio the axial distance $d_5$ between the surfaces S5 and S6 of the eye piece lens $L_3$ relative to the radius of paraxial curvature $R_5$ of the object side surface S5 of the eye piece lens $L_3$. If the upper limit of the second parameter is exceeded, the eye piece lens $L_3$ makes the axial distance $d_5$ too short and/or the radius of paraxial curvature $R_5$ of the object side surface S5 of the eye piece lens $L_3$ too large, separating the object focal point far from the eye point E.P. As a result, the axial distance between the movable lens $L_2$ and the eye piece lens $L_3$, which is always undesirable for the overall compactness of the finder lens system. An increase in the radius of paraxial curvature $R_5$ of the object side surface S5 of the eye piece lens $L_3$ yields significant aggravation of optical performances, such as spherical aberrations and the curvature of field, of the finder lens system. On the other hand, if the lower limit of the second parameter is exceeded, while the eye piece lens $L_3$ makes its the axial distance small, which is favorable for the finder lens system to provide well corrected aberrations, because the objective lens $L_1$ makes its diameter large, the eye piece lens $L_3$ with the radius of paraxial curvature $R_5$ of the object side surface S5 made too small makes the finder lens system encounters aggravation of aberrations. As a result, the finder lens system is apt to become large and consequently is hard to be compact in overall configuration. In addition, the eye piece lens $L_3$ with an increased axial distance is costly.

The finder lens systems described in Tables are examples of the invention. In the following Tables, the reference L followed by an Arabic numeral indicates the lens element progressively from the object side to the image side of the lens system. The reference S followed by an Arabic numeral indicates the lens surface progressively from the object side to the image side of the lens system. The reference radii numbers R are the progressive lens surface radii. Positive surface radii are struck from the right of the lens surface on the optical axis X. Negative surface radii are struck from the left of the lens surface on the optical axis X. $N_d$ is the index of refraction of the lens element. $v_d$ is the dispersion of the lens element as measured by the Abbe number. The reference distance numbers d are the progressive axial distances between adjacent lens surfaces. In each Table, the lens surface is accompanied by an asterisk (*) is aspherical.

Figure 1B:
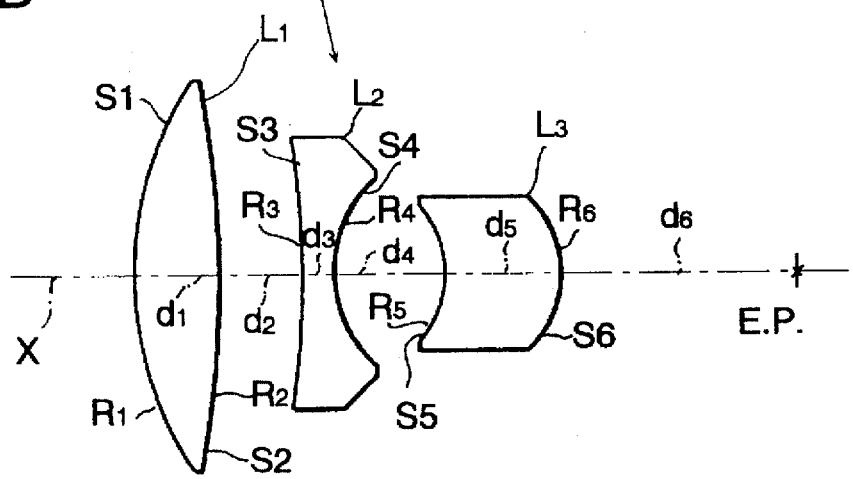
FIG. 1B is a diagrammatic side view of a zoom view finder optical system of FIG. 1A which is at the telephoto end.

A finder lens system as shown in FIG. 1 scaled to finder magnitudes of 0.380 to 0.643 is substantially described in Table I.

TABLE I

| Lens | Surface Radius (mm) | Axial Distance (mm) | $N_d$ | $v_d$ |
|---|---|---|---|---|
| $L_1$ | S1* $R_1$ = 14.763 | $d_1$ = 5.00 | 1.49023 | 57.6 |
|  | S1 $R_2$ = −53.288 | $d_2$ = Variable |  |  |
| $L_2$ | S2 $R_3$ = −45.959 | $d_3$ = 1.80 | 1.49023 | 57.6 |
|  | S3* $R_4$ = 4.045 | $d_4$ = Variable |  |  |
| $L_3$ | S4 $R_5$ = −4.185 | $d_5$ = 6.50 | 1.49023 | 57.6 |
|  | S5* $R_6$ = −5.226 | $d_2$ = 14.50 |  |  |
| E.P. |  |  |  |  |

Aspherical Surface $S_1$ $S_4$ and $S_6$ Aspherical Coefficients:

|  | $S_1$ | $S_4$ | $S_6$ |
|---|---|---|---|
| $a_2$ | $-1.0586 \times 10^{-4}$ | $9.7629 \times 10^{-5}$ | $3.2515 \times 10^{-4}$ |
| $a_3$ | $2.5983 \times 10^{-7}$ | $4.7558 \times 10^{-5}$ | $-4.1631 \times 10^{-7}$ |
| $a_4$ | $-1.8627 \times 10^{-9}$ | $-9.7501 \times 10^{-7}$ | $1.1921 \times 10^{-7}$ |
| $a_5$ | $1.3000 \times 10^{-13}$ | 0 | $4.5462 \times 10^{-9}$ |

Conic Constant:

| K | 1.0664 | −0.3319 | 0.7447 |

Paraxial Curvature:

| C | 0.067737 | 0.247219 | −0.191351 |

The finder lens system described in Table I has various optical dimensions at the wide angle end (W), the middle position (M), and the telephoto end (T) as follows:

|  | W | M | T |
|---|---|---|---|
| Zoom Spacing: |  |  |  |
| $d_2$ | 0.60 | 2.80 | 5.00 |
| $d_4$ | 10.70 | 8.50 | 6.30 |
| Finder Magnitude: |  |  |  |
|  | 0.380 | 0.488 | 0.643 |
| $R_5/R_6$ |  |  |  |
|  | 0.8008 | −1.5532 |  |
| $d_5/R_5$ |  |  |  |

As apparent from the above table of optical dimensions, the finder lens system substantially described in Table I satisfies the conditions (1) and (2). As shown in FIGS. 4A–4C, 5A–5C and 6A–6C, the finder lens system provides well balanced aberrations between the wide angle end and the telephoto end.

Figure 2A:
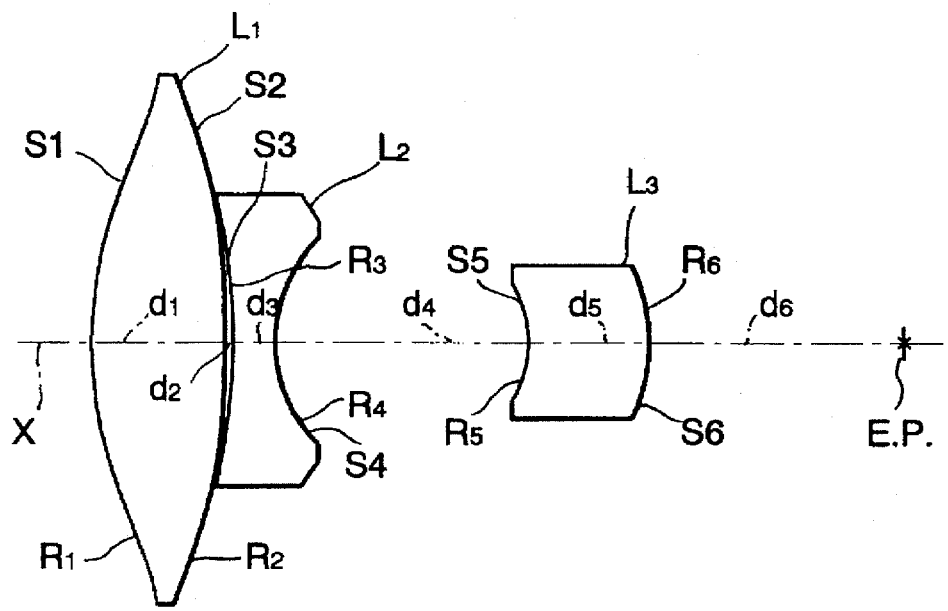
FIG. 2A is a diagrammatic side view of a zoom view finder optical system in accordance with another embodiment of the invention which is at the wide angle end.
Figure 2B:
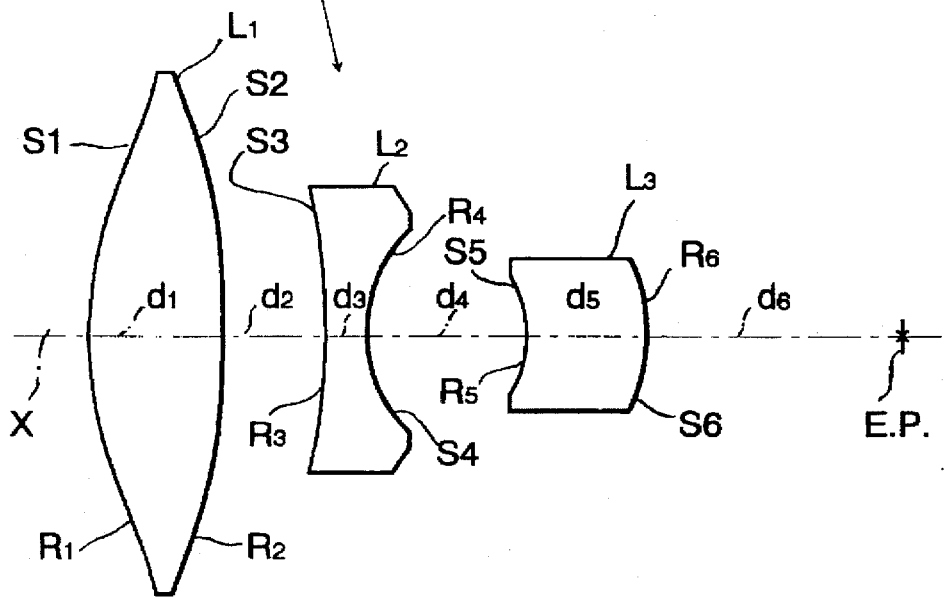
FIG. 2B is a diagrammatic side view of a zoom view finder optical system of FIG. 2A which is at the telephoto end.

A finder lens system shown in FIG. 2 scaled to finder magnitudes of 0.38 to 0.65 is substantially described in Table II.

TABLE II

| Lens | Surface Radius (mm) | Axial Distance (mm) | $N_d$ | $v_d$ |
|---|---|---|---|---|
| $L_1$ | $S_1$* $R_1$ = 20.687 | $d_1$ = 7.50 | 1.49023 | 57.6 |
|  | $S_2$* $R_2$ = −39.254 | $d_2$ = Variable |  |  |
| $L_2$ | $S_3$ $R_3$ = −30.475 | $d_3$ = 2.38 | 1.49023 | 57.6 |
|  | $S_4$ $R_4$ = 5.472 | $d_4$ = Variable |  |  |
|  | $S_5$ $R_5$ = −4.870 |  |  |  |

TABLE II-continued

| | | $d_5 = 7.37$ | 1.49023 | 57.6 |
|---|---|---|---|---|
| $L_3$ | $S_6^* \; R_6 = -6.136$ | | | |
| E.P. | | $d_2 = 14.50$ | | |

Aspherical Surface $S_1$ $S_2$ and $S_6$ Aspherical Coefficients:

| | $S_1$ | $S_2$ | $S_6$ |
|---|---|---|---|
| $a_2$ | $-2.02910 \times 10^{-5}$ | $-1.54711 \times 10^{-3}$ | $3.29853 \times 10^{-4}$ |
| $a_3$ | $8.84260 \times 10^{-8}$ | $4.64842 \times 10^{-5}$ | $-3.79208 \times 10^{-6}$ |
| $a_4$ | $-2.93717 \times 10^{-10}$ | $-9.67381 \times 10^{-7}$ | $7.81053 \times 10^{-8}$ |
| $a_5$ | 0 | 0 | 0 |

Conic Constant:

| K | $-1.98560$ | 0.61429 | 0.88445 |
|---|---|---|---|

Paraxial Curvature:

| C | 0.0483395 | 0.1827485 | $-0.1629726$ |
|---|---|---|---|

The finder lens described in Table II has various optical dimensions at the wide angle end (W), the middle position (M), and the telephoto end (T) as follows:

| | W | M | T |
|---|---|---|---|
| Zoom Spacing: | | | |
| $d_2$ | 0.60 | 3.70 | 6.06 |
| $d_4$ | 14.30 | 11.20 | 8.84 |
| Finder Magnitude: | | | |
| | 0.38 | 0.51 | 0.65 |
| $R_5/R_6$ | | $d_5/R_5$ | |
| 0.7938 | | $-1.5133$ | |

As apparent from the above table of optical dimensions, the finder lens system substantially described in Table II satisfies the conditions (1) and (2). As shown in FIGS. 7A–7C, 8A–8C and 9A–9C, the finder lens system provides well balanced aberrations between the wide angle end and the telephoto end.

Figure 3A:
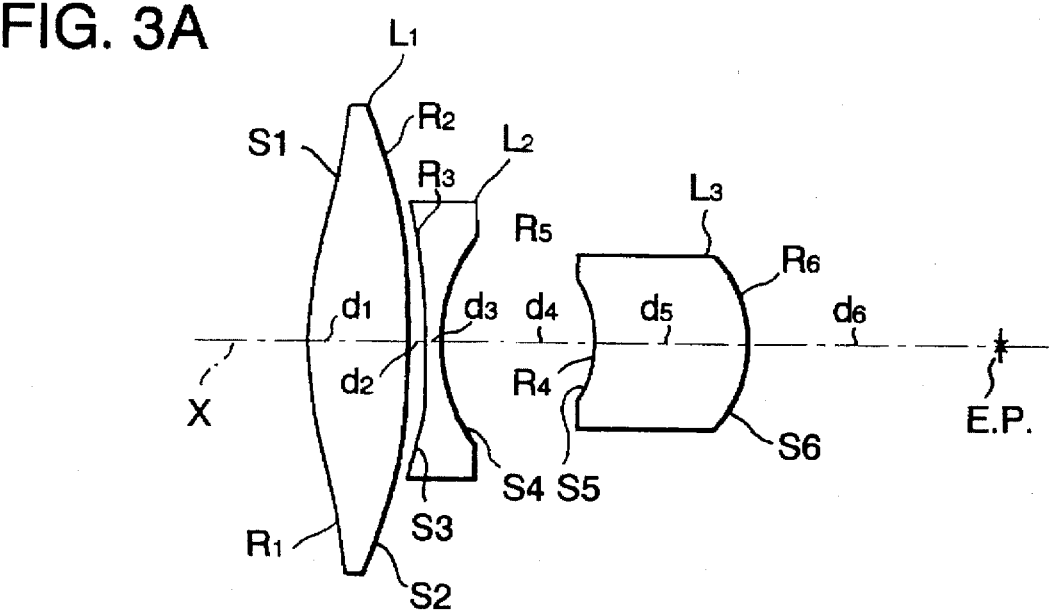
FIG. 3A is a diagrammatic side view of a zoom view finder optical system in accordance with another embodiment of the invention which is at the wide angle end.
Figure 3B:
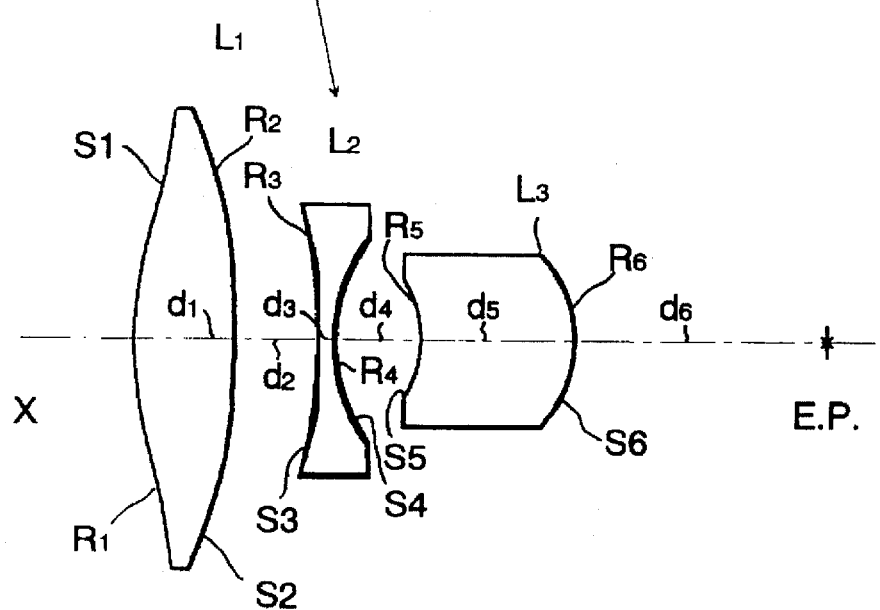
FIG. 3B is a diagrammatic side view of a zoom view finder optical system of FIG. 3A which is at the telephoto end.
Figure 4C:
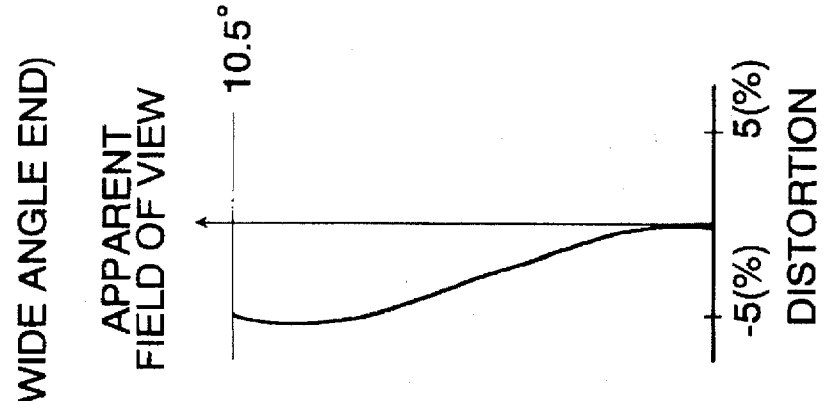
FIGS. 4A, 4B and 4C are diagrams showing aberrations at the wide angle end of the zoom view finder optical system of FIG. 1.
Figure 4B:
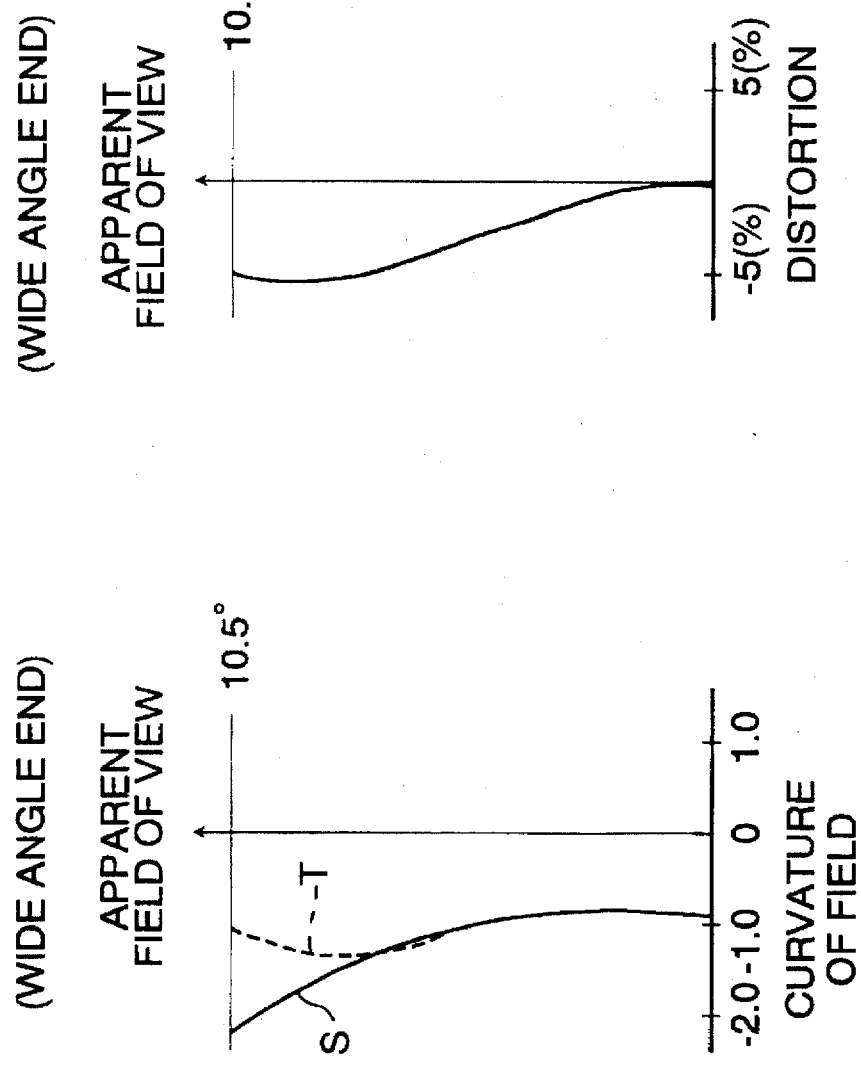
Figure 4A:
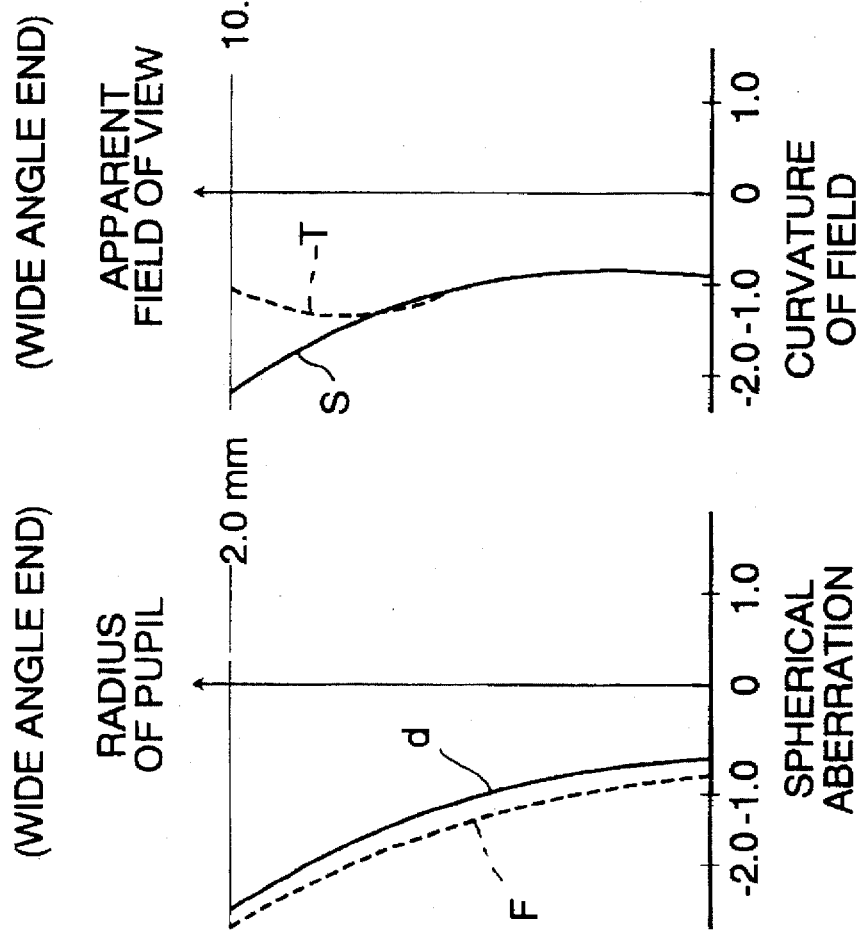
Figures 7A, 7B, 7C:
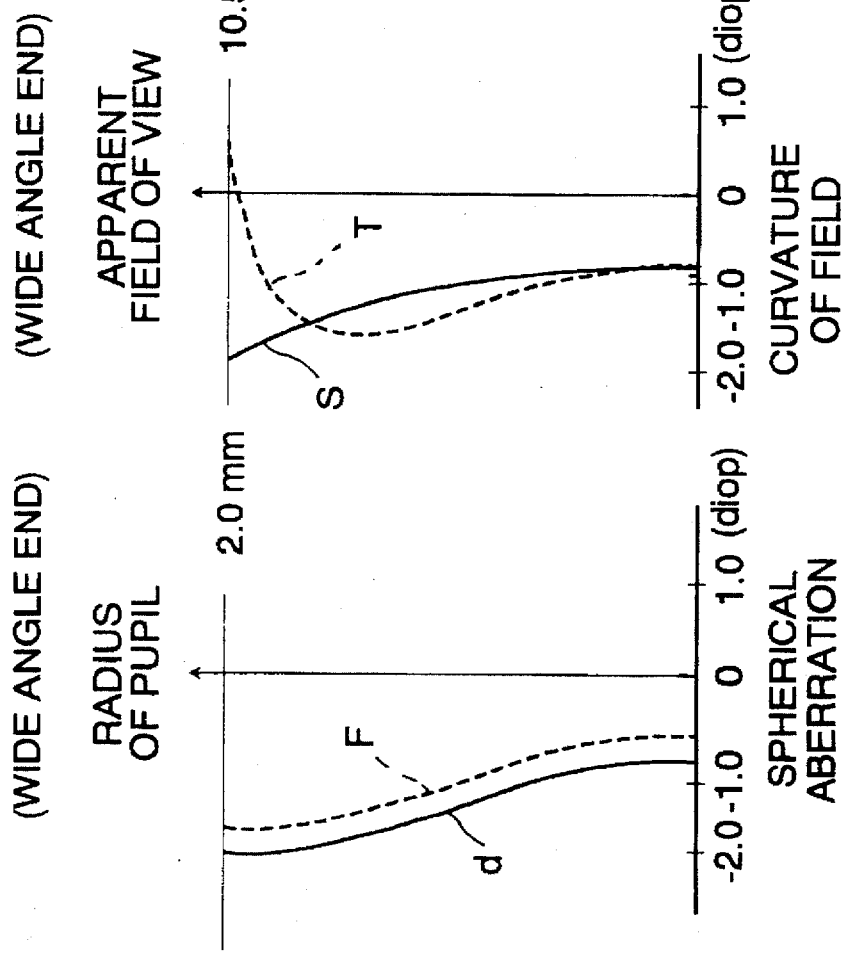
FIGS. 7A, 7B and 7C are diagrams showing aberrations at the wide angle end of the zoom view finder optical system of FIG. 2.

A finder lens system as shown in FIG. 3 scaled to finder magnitudes of 0.3800 to 0.6257 is substantially described in Table III.

TABLE III

| Lens | Surface Radius (mm) | Axial Distance (mm) | $N_d$ | $v_d$ |
|---|---|---|---|---|
| $L_1$ | $S_1^* \; R_1 = 14.657$ | $d_1 = 5.70$ | 1.49023 | 57.6 |
| | $S_2 \;\; R_2 = -40.177$ | $d_2 = $ Variable | | |
| $L_2$ | $S_3 \;\; R_3 = -29.162$ | $d_3 = 1.80$ | 1.49023 | 57.6 |
| | $S_4^* \; R_4 = 4.352$ | $d_4 = $ Variable | | |
| $L_3$ | $S_5 \;\; R_5 = -5.314$ | $d_5 = 8.98$ | 1.49023 | 57.6 |
| | $S_6^* \; R_6 = -6.680$ | | | |
| E.P. | | $d_2 = 14.50$ | | |

Aspherical Surface $S_1$ $S_4$ and $S_6$ Aspherical Coefficients:

| | $S_1$ | $S_4$ | $S_6$ |
|---|---|---|---|
| $a_2$ | $-1.1049 \times 10^{-4}$ | $-1.5749 \times 10^{-4}$ | $3.0703 \times 10^{-4}$ |
| $a_3$ | $2.7705 \times 10^{-7}$ | $4.1999 \times 10^{-5}$ | $-3.9041 \times 10^{-6}$ |
| $a_4$ | $-2.0840 \times 10^{-9}$ | $-9.6928 \times 10^{-7}$ | $6.1240 \times 10^{-8}$ |
| $a_5$ | $1.3000 \times 10^{-13}$ | $5.8965 \times 10^{-19}$ | $3.8142 \times 10^{-9}$ |

Conic Constant:

| K | 0.9686 | $-0.5484$ | 0.8642 |
|---|---|---|---|

Paraxial Curvature:

| C | 0.068227 | 0.229779 | $-0.149701$ |
|---|---|---|---|

The finder lens system described in Table III has various optical dimensions at the wide angle end (W), the middle position (M), and the telephoto end (T) as follows:

| | W | M | T |
|---|---|---|---|
| Zoom Spacing: | | | |
| $d_2$ | 0.60 | 2.80 | 4.57 |
| $d_4$ | 10.63 | 8.43 | 6.66 |
| Finder Magnitude: | | | |
| | 0.3800 | 0.4948 | 0.6257 |
| $R_5/R_6$ | | $d_5/R_5$ | |
| 0.7955 | | $-1.6899$ | |

As apparent from the above table of optical dimensions, the finder lens system substantially described in Table III satisfies the conditions (1) and (2). As shown in FIGS. 10A–10C, 11A–11C and 12A–12C, the finder lens system provides well balanced aberrations between the wide angle end and the telephoto end.

The eye piece lens $L_3$ of each of the finder lens systems according to the specific embodiments of the invention shown in FIG. 1, 2 and 3 respectively is practically replaced with an eye piece lens $L_3'$ having a framing mark projection feature in FIG. 13, 16A and 16B, 18. As will be individually described in detail later, the eye piece lens $L_3'$ has an object side surface S5 partly formed with a half transparent coating and partly formed as a reflective surface outside the available surface area through which light rays from the field of view passes and an image side surface partly formed as a reflective surface outside the available surface area for reflecting into the view finder the framing mark showing the field of view which is formed on a reticle positioned on the object side of the eye piece lens. Specifically, the combination of a half transparent object side surface S5 and a reflective image side surface of the eye piece lens element causes internal reflection of off-axial light rays outside the effective aperture of the view finder. While, if the Albada type view finder in which the reticle is positioned in front of the image side surface S6 of an eye piece lens $L_3'$, the eye piece lens $L_3'$ may have only an image side surface S6 formed partly with a half transparent coating, however, the eye piece lens $L_3'$ must have a large curvature on its object side surface S5 and makes it hard to avoid a divergent optical system for the zoom view finder. For this reason, it is necessary to incorporate the eye piece lens $L_3'$ formed partly with a half transparent object side surface S5 and partly with a reflective image side surface to project an image of framing mark positioned on the front side of eye piece lens $L_3'$. It is also necessary to form the reflective surface outside the available surface area through which light rays from the field of view of the view finder passes in order to prevent an eclipse of the light rays from the field of view of the view finder.

When using the reticle of framing mark, positioning the reticle closely to the objective lens $L_1$ is effective for the reticle to be well lightened and to prevent an image of the framing mark from being enhanced to excess. The necessity of an excessive magnification of an image of framing mark makes it hard to position the reticle with a high accuracy, and needs to form very thin framing mark, which always makes it hard to process the reticle.

The eye piece lens $L_3'$ has its image side surface S6 partly formed with a spherical reflective surface or alternatively with an aspherical reflective surface, each surface having the center of curvature at a point on the optical axis of the view finder optical system. This is essential to form efficiently the view finder optical system. Locating the center of curvature radius of the reflective surface at a point on the optical axis of the view finder optical system makes it easy to improve the imaging performance of the optical system. The eye piece lens $L_3'$ may have the image side surface S6 made partly transparent and partly reflective, both surfaces having the same radius of curvature. While these surfaces may have their centers of curvature radius at the same point on the optical axis, however, in this case, the framing mark projection optical system is made to have a focal length too short for the image of framing mark to be projected at an appropriate magnification. In order for the framing mark projection optical system to project the image of framing mark at an appropriate magnification, the reflective image side surface is preferred to have a radius of curvature larger than the transparent image side surface S6. It is preferred for the eye piece lens $L_3'$ to have more than two surfaces which cause internal reflection of light rays passed through the reticle. This meets the demand for a long focal length of the framing mark projection optical system necessary to project an image of framing mark at an appropriately small magnification and is realized by forming the internally reflective surfaces at peripheral surfaces of the eye piece lens $L_3'$ which has a large thickness.

In the case where the reflective surface is formed as a spherical surface, or otherwise as an aspherical surface, having its center of curvature radius at a point on the optical axis, in order to permit the reticle to be positioned appropriately far from the optical axis so as to provide a sufficient space for axial movement of the movable lens and to prevent an eclipse of the light rays from the viewfinder field, it is preferred to form the reflective surface inclined at an angle with respect to a plane perpendicular to the optical axis of the view finder optical axis. Forming the eye piece lens $L_3'$ with more than two reflective surfaces provides a long optical path length, which makes the distance between the eye piece lens $L_3'$ and the reticle short, and hence permits the reticle to be located closely to the object side surface of the reticle.

Either the surface of the eye piece lens $L_3'$ which light rays from the reticle enter or a surface of an optical $L_3'$ disposed in an optical path between the reticle and the eye piece lens $L_3'$ which light rays from the reticle enter may be formed as a compensating lens surface for adjusting the diopter of the eye piece lens $L_3'$ so as to provide a clear image of framing mark. If the view finder optical lens system is not provided with a diopter compensating lens surface, the framing mark projection optical system forms an image of framing mark far from the objective lens element $L_1$ toward the object field, which is always undesirable. While it is theoretically possible to locate a framing mark reticle in front of and close proximity to the objective lens element $L_1$ and in the optical path of light ray from the field of view, various optical restraints must be imposed on the reticle. For example, in order to provide a bright clear image of framing mark, such a reticle is required to have an extremely high transparency or otherwise to be formed with a multi-layer reflection reducing coating.

The eye piece lens $L_3'$ equipped with the frame mark projection feature is formed as an integral lens element which makes a contribution to assembling accuracy, and a reduction in the number of parts of the view finder, and a simplified structure of the view finder, which are always desired to provide an inexpensive zoom view finder. The view finder according to the embodiment of the invention has a magnification of approximately 0.38 to 0.65 and a zoom ratio of approximately 1.8. Further, the view finder comprised of three lens elements and equipped with the framing mark projection feature has an overall compactness similar to fixed focal length view finders having an overall length of approximately 25 mm.

Mentioning regarding framing mark projection, the view finder of the invention is able to incorporate a function of change over framing format from a Lica size to a panoramic size or vise versa which the Albada type of zoom view finders are hard to do. If the objective lens $L_1$ is comprised of two lens elements, while the zoom view finder becomes larger in size, the zoom ratio and other optical performance are improved.

Figure 13:
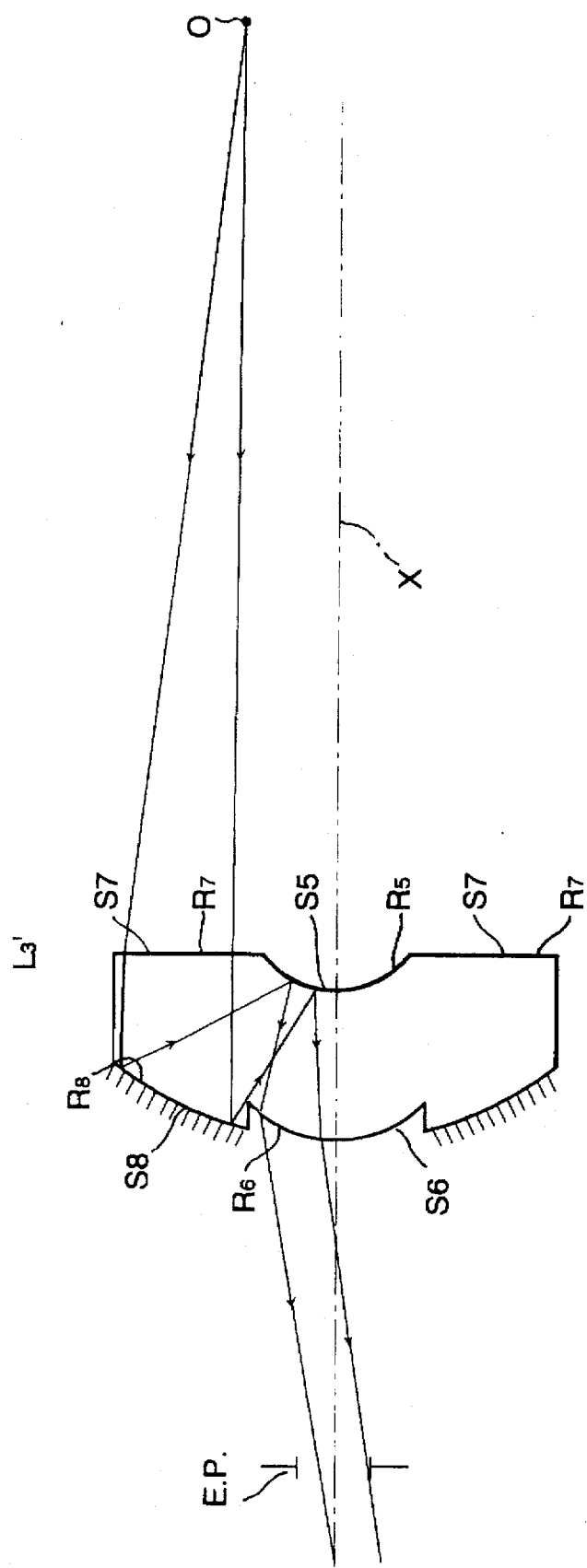
FIG. 13 is a diagrammatic side view of an eye piece lens of a zoom view finder optical system in accordance with another embodiment of the invention.

FIG. 13 shows an eye piece lens $L_3'$ equipped with the framing mark projection feature in accordance with an embodiment of the invention. The eye piece lens $L_3'$ is a meniscus singlet having a convex image side surface S6 and a strong curvature of object side concave surface S5 which is fundamentally the same in optical characteristics as an eye piece lens element as the eye piece lens $L_3$ shown in FIGS. 1A and 1B. The object side surface S5 is formed with a half transparent coating. The eye piece lens $L_3'$ is formed with a convex surface 14 around the image side surface S6 and a flat surface 15 around the object side surface S5. The convex surface 14 is formed as a reflective surface causing internal reflection. These surfaces formed at both object and image side surfaces of the eye piece lens $L_3'$ forms a framing mark projection optical system.

Light rays from a point 0 off the optical axis X of the view finder optical system incident on the marginal flat surface 15 are reflected by the internal surface of the marginal reflective surface 14 and subsequently by the internal surface of the half transparent object side surface S5. The light rays thereafter pass through the image side surface S6 and travel to the eye point E.P. in the form of parallel light rays. On the other hand, object light rays incident on the object side surface S5 pass through the image side surface S6 and travel to the eye point E.P. as well.

The eye piece lens $L_3'$ is described in the following Table IV. In Table IV, because the eye piece lens $L_3'$ is regarded as a loupe, positive surface radii are struck from the left right (the object side) of the lens surface on the optical axis X, and the negative distance is measured from the right (the image side).

TABLE IV

| Lens | Surface Radius (mm) | Axial Distance (mm) | $N_d$ | $v_d$ |
|---|---|---|---|---|
| E.P. | | $d_6 = 14.50$ | | |
| | $S_6* \ R_6 = -5.226$ | | | |
| | | $d_5 = 6.50$ | 1.49023 | 57.6 |
| | $S_5 \ R_5 = 4.185$ | | | |
| $L_3'$ | | $d_7 = -6.50$ | −1.49023 | 57.6 |
| | $S_8* \ R_8 = 16.500$ | | | |
| | | $d_8 = 7.9$ | 1.49023 | 57.6 |
| | $S_7 \ R_7 = \infty$ | | | |

Aspherical Surface $S_6$ and $S_8$ Aspherical Coefficients:

| | $S_6$ | $S_8$ |
|---|---|---|
| $a_2$ | $-3.2515 \times 10^{-4}$ | $-1.9887 \times 10^{-5}$ |
| $a_3$ | $4.1631 \times 10^{-7}$ | $3.5151 \times 10^{-9}$ |
| $a_4$ | $-1.1921 \times 10^{-7}$ | $-6.3754 \times 10^{-10}$ |
| $a_5$ | $-4.5462 \times 10^{-9}$ | $1.1992 \times 10^{-13}$ |

TABLE IV-continued

| | Conic Constant: | |
|---|---|---|
| K | 0.7447 | 1.0508 |
| | Paraxial Curvature: | |
| C | 0.191351 | 0.060606 |

The framing mark projection optical system has a focal length f and a back focal distance $f_B$ as follows:

| Focal Length or Distance: | |
|---|---|
| f | 26.761 |
| $f_B$ | 48.678 |

Figure 14C:
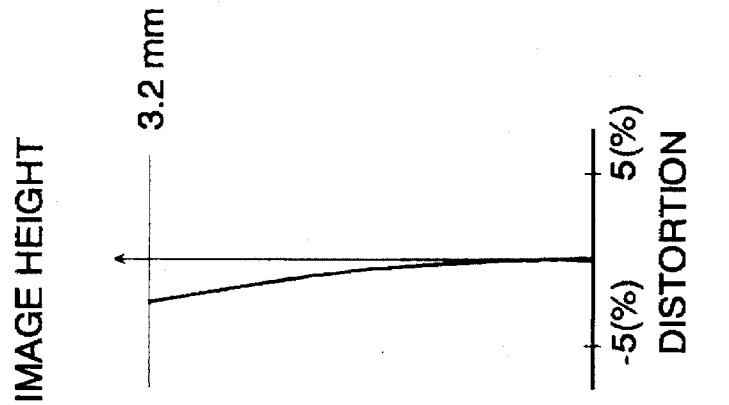
FIG. 14 is a diagram showing aberrations of a visual field framing mark projection optical system of the zoom view finder optical system of FIG. 13.
Figure 14B:
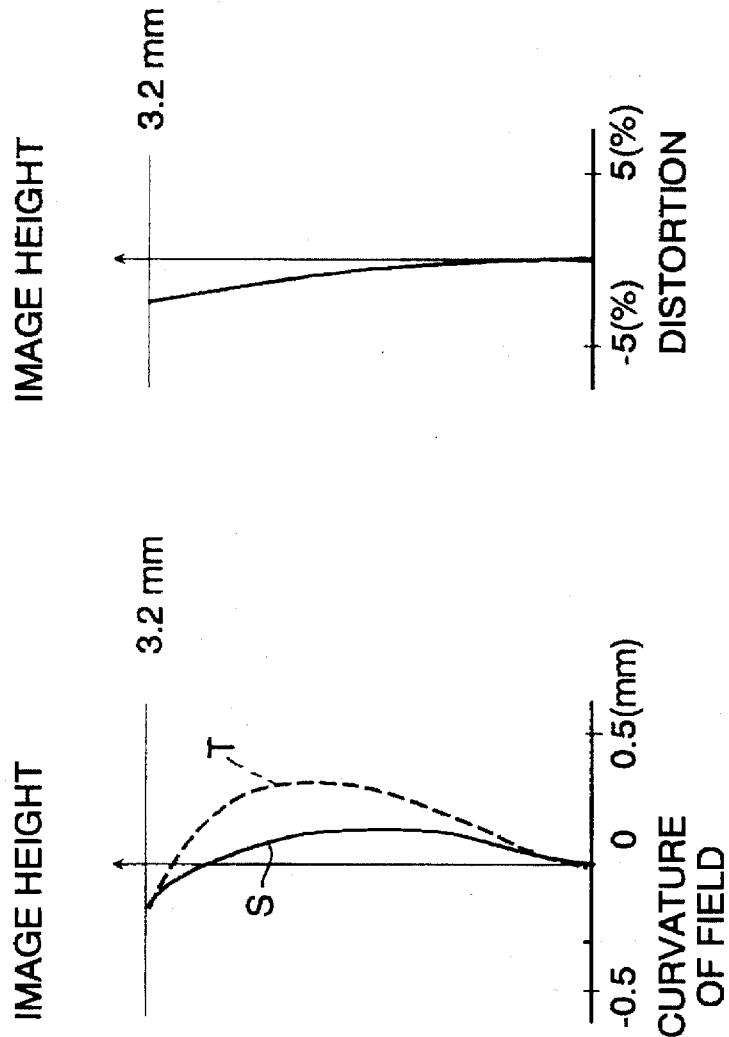
Figure 14A:
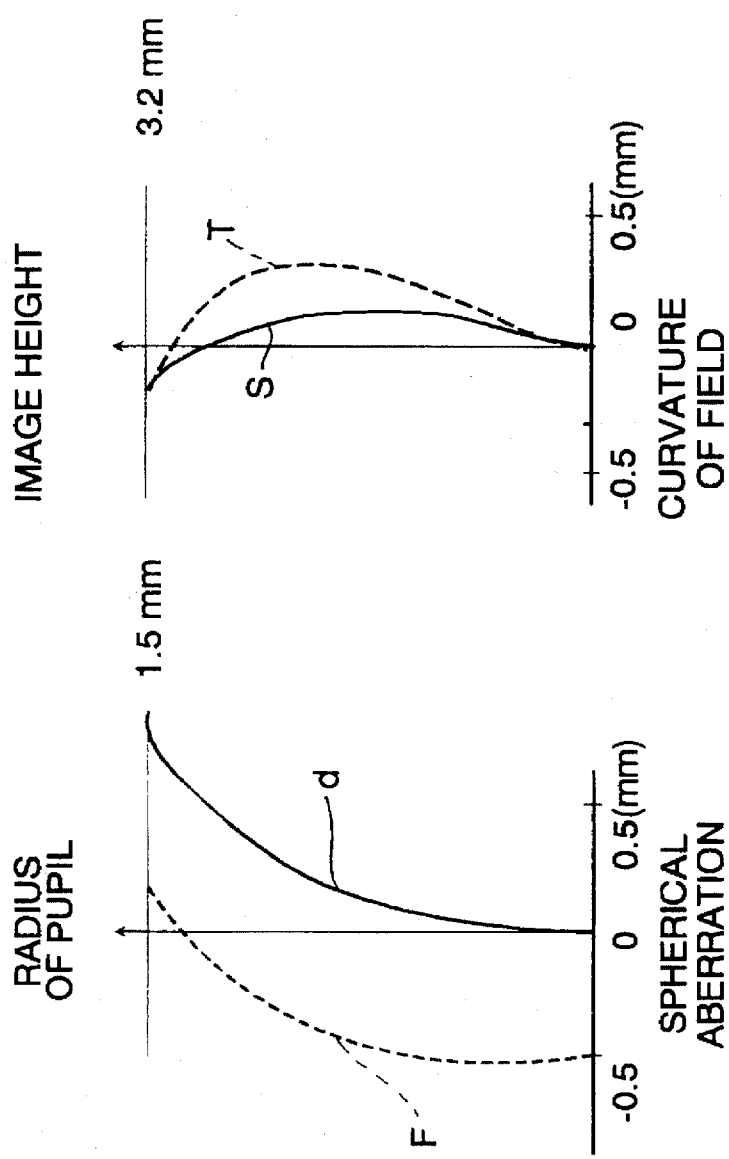

As shown in FIGS. 14A–14C, the finder lens system provides well balanced aberrations. Practically, central light rays are cut off.

Figure 15:
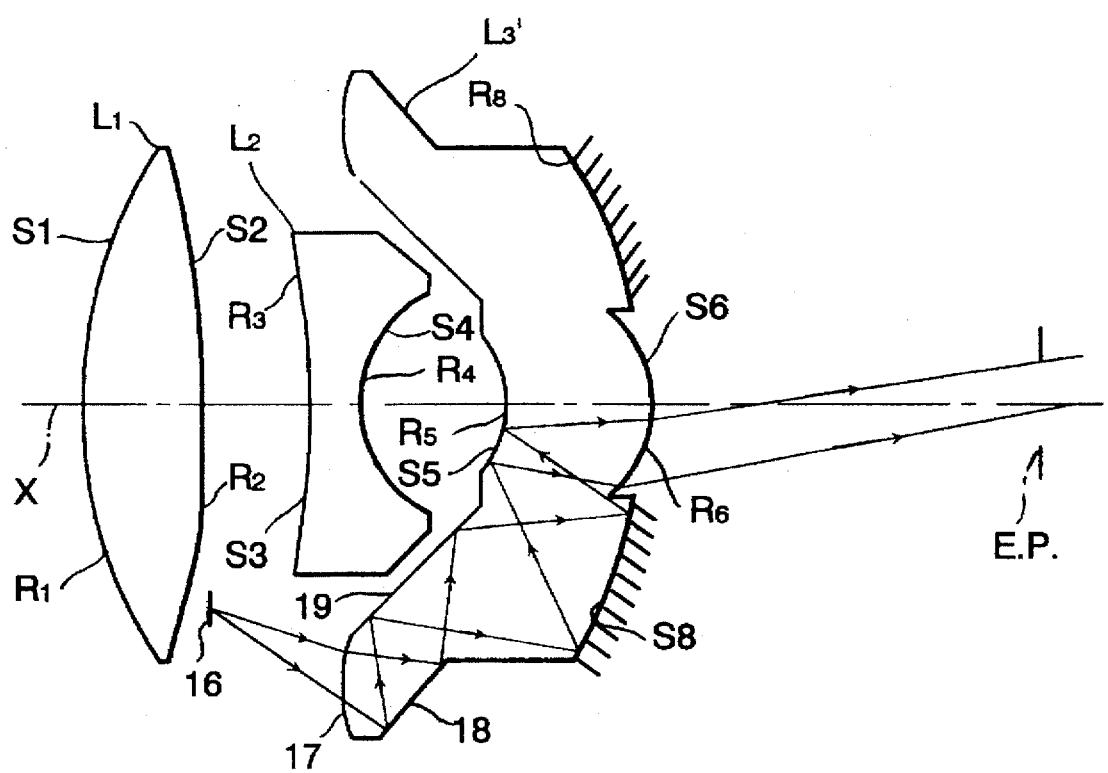
FIG. 15 is a diagrammatic side view of the zoom view finder optical system of FIG. 13.

FIG. 15 shows a view finder optical system with a modified configuration of the eye piece lens $L_3'$ of FIG. 13 at the telephoto end. The view finder optical system of FIG. 15 is similar to that of FIGS. 1A and 1B but the eye piece lens $L_3$ is replaced with the modified eye piece lens $L_3'$. The modified eye piece lens $L_3'$ is formed with an rim-like lens extension as integral part. The lens extension has an inner object side transparent surface 19, an outer object side transparent surface 17 around the inner object side transparent surface 19 and an image side transparent surface 18 facing both object side transparent surfaces 17 and 19. Light rays from a reticle 16 incident on the outer object side transparent surface 17 are internally reflected by the image side surface 18 and subsequently by the object side surface 19. The reticle image light rays are further internally reflected back by the convex reflective surface S8 around the convex image side surface S6 and directed to the convex image side surface S6. In this way, the image of the reticle 16 is reflected and introduced into the view of the view finder. The reticle 16 may practically be formed as reticle segments having right-angled transparent marks located at the corners of a rectangular framing limit.

Figure 16A:
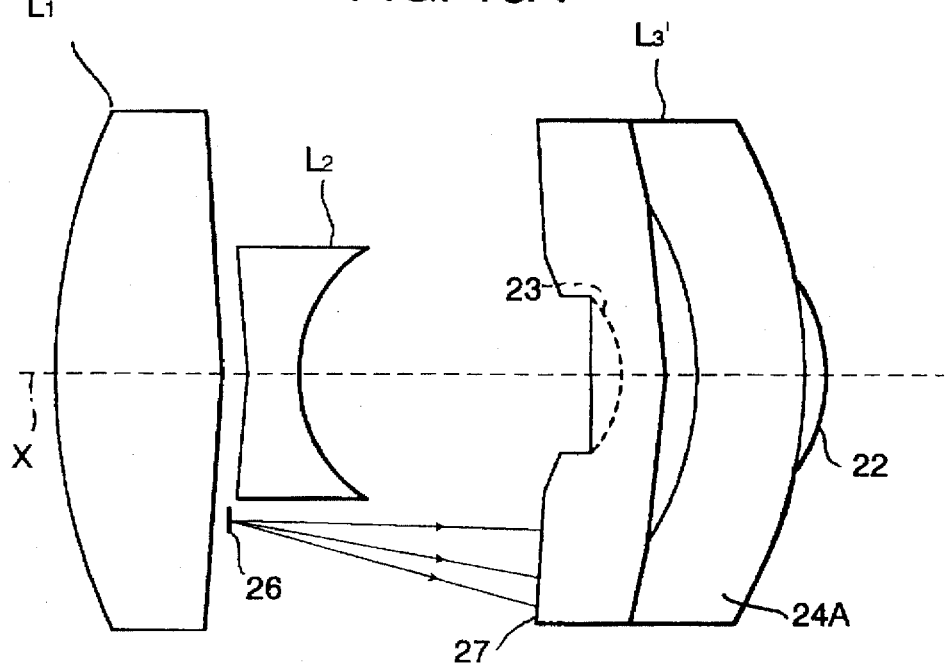
FIG. 16A is a rear perspective view of an eye piece lens of the zoom view finder optical system of FIGS. 17A and 17B.
Figure 16B:
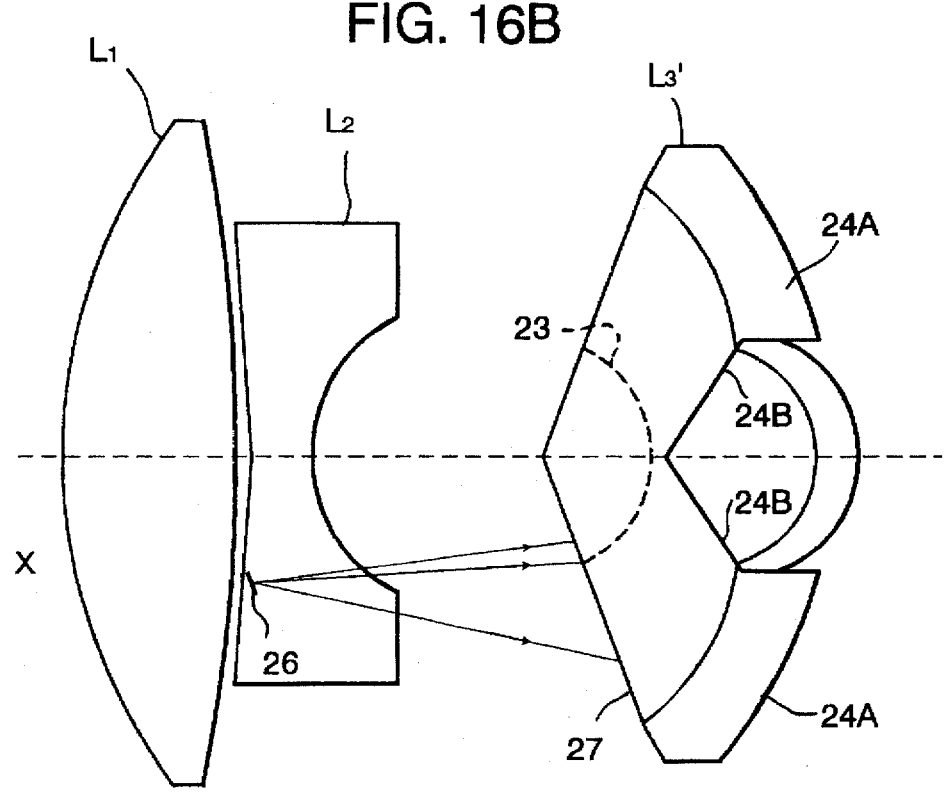
FIG. 16B is a front perspective view of an eye piece lens of the zoom view finder optical system of FIGS. 17A and 17B.
Figure 17A:
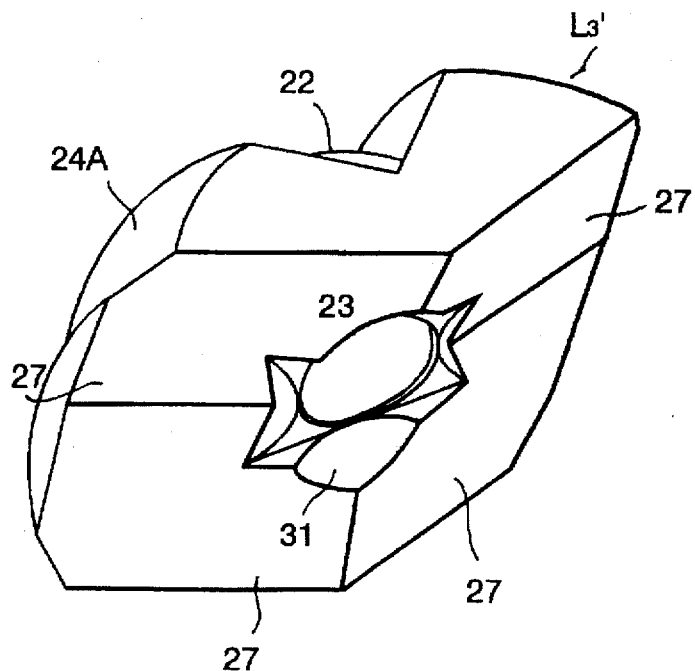
FIG. 17A is a diagrammatic side view of a zoom view finder optical system in accordance with another embodiment of the invention.
Figure 17B:
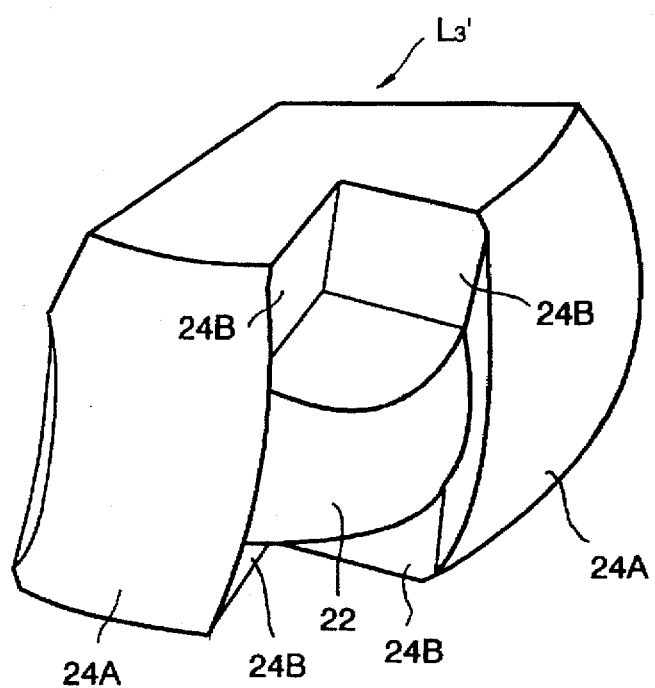
FIG. 17B is a diagrammatic top view of the zoom view finder optical system of FIG. 17A.

FIGS. 16A and 16B show a view finder optical system with a modified configuration of the eye piece lens $L_3'$ of FIGS. 17A and 17B at the wide angle end. The view finder optical system of FIGS. 16A and 16B is similar to that of FIGS. 2A and 2B but the eye piece lens $L_3$ is replaced with the modified eye piece lens $L_3'$.

FIGS. 17A and 17B show an eye piece lens $L_3'$ equipped with the framing mark projection feature in accordance with an embodiment of the invention. The eye piece lens $L_3'$ is a meniscus singlet having a convex image side surface S6 and a strong curvature of object side concave surface S5 which is fundamentally the same in optical characteristics as an eye piece lens element as the eye piece lens $L_3$ shown in FIGS. 2A and 2B.

As shown in FIGS. 16A through 17B, the eye piece lens $L_3'$ at the object side has quartered flat half transparent surfaces 27 around the half transparent object side surface S5, each being inclined at a specified angle with respect to the optical axis X, and a cutout 31 between the half transparent object side surface S5 and each adjacent half transparent surfaces 27. On the other hand, the eye piece lens $L_3'$ at the image side has curved reflective surfaces 24A causing internal reflection on both sides of the image side surface S6 and right-angled flat reflective surfaces 24B causing internal reflection, each being formed between the curved reflective surfaces 24A on both sides of the image side surface S6. These surfaces formed at both object and image side surfaces of the eye piece lens $L_3'$ forms a framing mark projection optical system. The cutouts 31 prevent an eclipse of the light rays from the field of view of the view finder. The reflective surfaces 24A and 24B are formed with aluminum coatings by vacuum vapor deposition. The eye piece lens $L_3'$ is shaped symmetrically with respect to a vertical plane including the optical axis X and a horizontal plane including the optical axis X.

Figure 18:
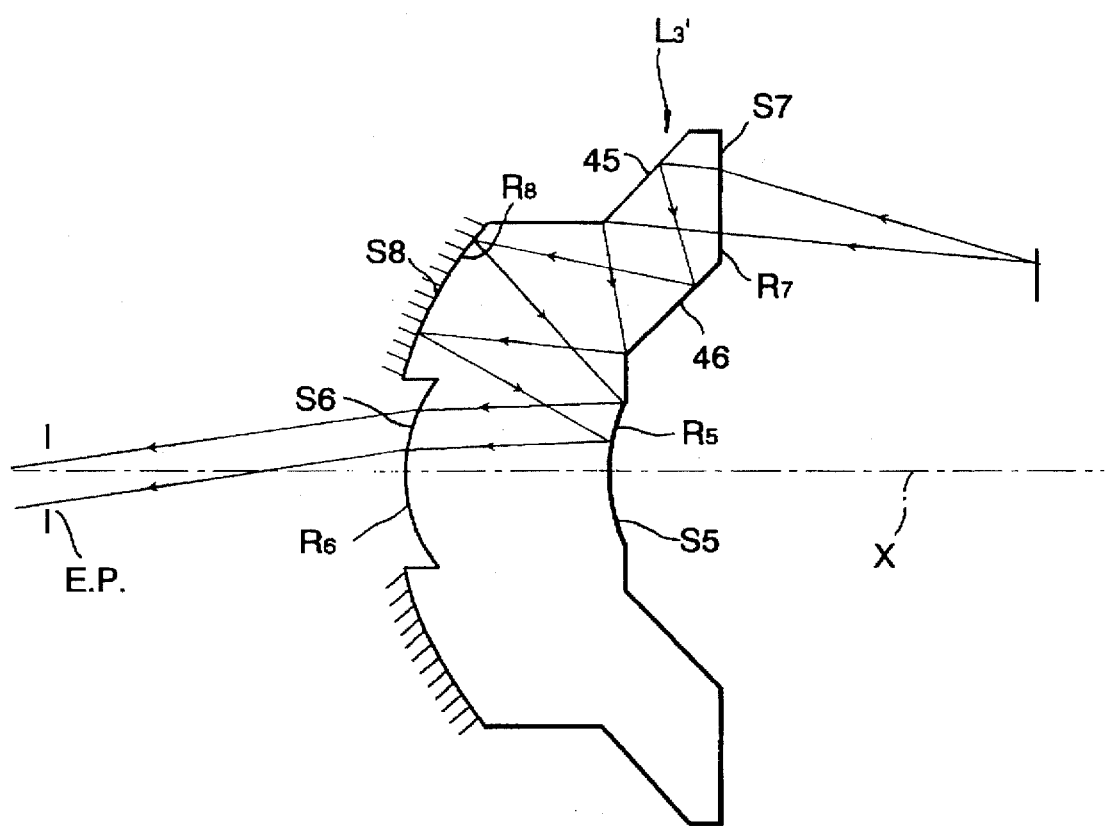
FIG. 18 is a diagrammatic side view of an eye piece lens of a zoom view finder optical system in accordance with another embodiment of the invention.

FIG. 18 shows an eye piece lens $L_3'$ equipped with the framing mark projection feature in accordance with an embodiment of the invention. The eye piece lens $L_3'$ is a meniscus singlet having a convex image side surface S6 and a strong curvature of object side concave surface S5 which is fundamentally the same in optical characteristics as the eye piece lens $L_3$ shown in FIGS. 3A and 3B. The object side surface S5 is applied with a half transparent coating. The eye piece lens $L_3'$ is formed with a convex surface 44 around the image side surface S6. The convex surface S8 is formed as a reflective surface causing internal reflection. Further, the modified eye piece lens $L_3'$ is formed with an rim-like lens extension as integral part. The lens extension has an outer object side flat transparent surface S7, an inner object side surface 46 formed between the outer object side transparent surface S7 and the object side surface S5. The lens extension further has an outer image side surface 45 which is substantially in parallel with the inner object side surface 46. These inner object side reflective surface 46 and outer image side surface 45 cause internal reflection.

Light rays from a point O off the optical axis X of the view finder optical system incident on the outer object side transparent surface S7 are reflected by the outer image side surface 45 and subsequently by the inner object side surface 46 and directed to the convex reflective surface S8. In this way, the light rays reflected by the convex reflective surface S8 are reflected by the image side surface S5 and introduced into the view of the view finder.

The eye piece lens $L_3'$ is described in the following Table V. In Table IV, because the eye piece lens $L_3'$ is regarded as a loupe, positive surface radii are struck from the left right (the object side) of the lens surface on the optical axis X, and the negative distance is measured from the right (the image side).

TABLE V

| Lens | Surface Radius (mm) | Axial Distance (mm) | $N_d$ | $v_d$ |
|---|---|---|---|---|
| E.P. | | | | |
| | | $d_6 = 14.50$ | | |
| | $S_6* R_6 = 6.680$ | | | |
| | | $d_5 = 8.981$ | 1.49023 | 57.6 |
| | $S_5 R_5 = 5.314$ | | | |
| $L_3'$ | | $d_8 = -8.981$ | -1.49023 | 57.6 |
| | $S_8* R_8 = 18.829$ | | | |
| | | $d_7 = 17.800$ | 1.49023 | 57.6 |
| | $S_7 R_7 = \infty$ | | | |

| Aspherical Surface $S_6$ and $S_8$ Aspherical Coefficients: | | |
|---|---|---|
| | $S_6$ | $S_8$ |
| $a_2$ | $-3.0703 \times 10^{-4}$ | $-5.7433 \times 10^{-6}$ |
| $a_3$ | $3.9041 \times 10^{-6}$ | $-7.6862 \times 10^{-9}$ |
| $a_4$ | $-6.1240 \times 10^{-8}$ | $-2.7537 \times 10^{-11}$ |
| $a_5$ | $-3.8142 \times 10^{-9}$ | $2.5291 \times 10^{-13}$ |

| Conic Constant: | | |
|---|---|---|
| K | 1.0156 | 0.8642 |

TABLE V-continued

| | Paraxial Curvature: | |
|---|---|---|
| C | 0.053110 | 0.149701 |

The framing mark projection optical system has a focal length f and a back focal distance $f_B$ as follows:

| f | 12.942 |
|---|---|
| $F_B$ | 13.948 |

Figure 19:
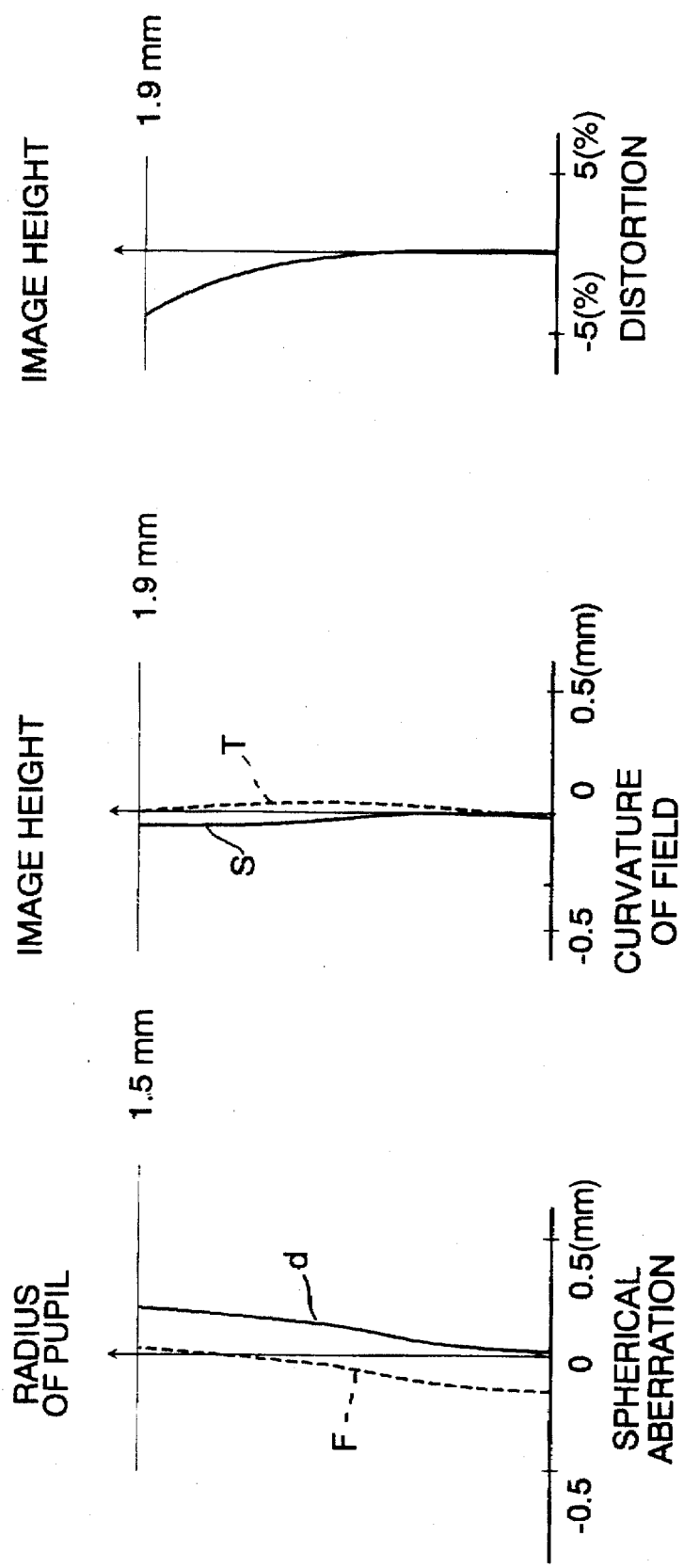
FIG. 19 is a diagram showing aberrations of a visual field framing mark projection optical system of the zoom view finder optical system of FIG. 18.

As shown in FIGS. 19A–19C, the finder lens system provides well balanced aberrations. Practically, central light rays are cut off.

Figure 20:
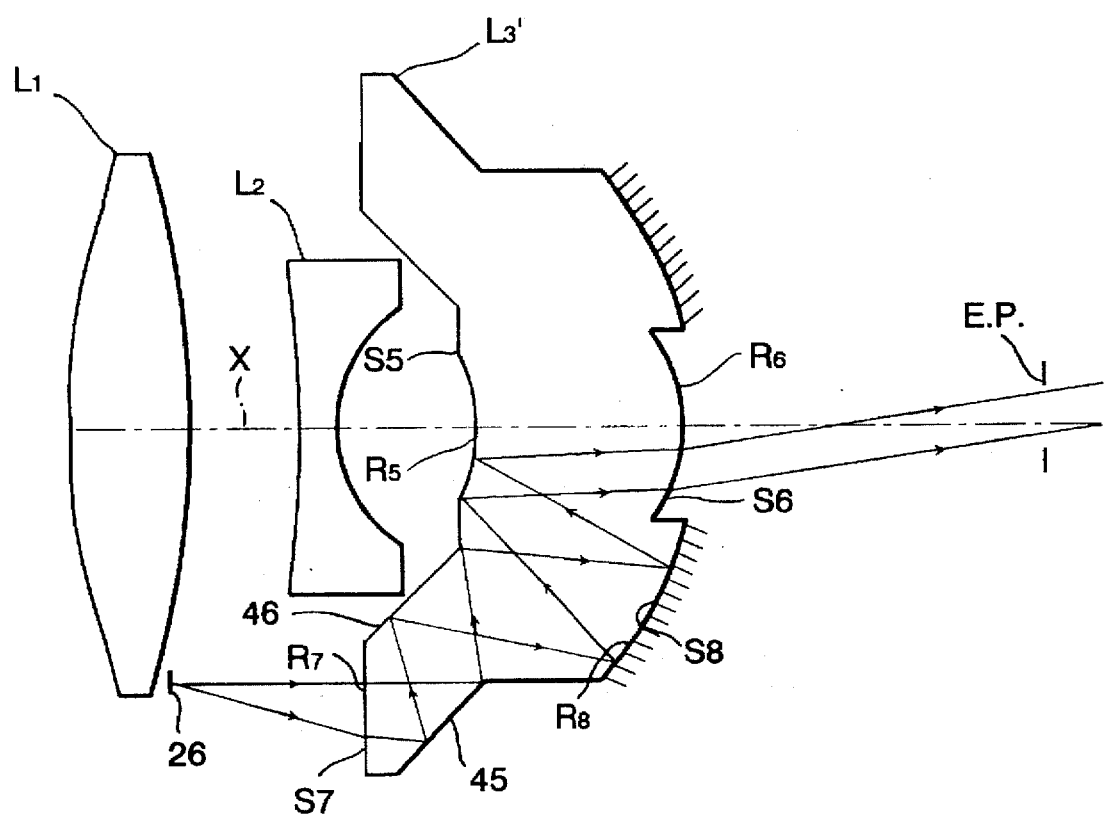
FIG. 20 is a diagrammatic side view of an eye piece lens of a zoom view finder optical system in accordance with still another embodiment of the invention.

FIG. 20 shows a view finder optical system with a modified configuration of the eye piece lens $L_3'$ of FIG. 18 at the telephoto end. The view finder optical system of FIG. 20 is similar to that of FIGS. 3A and 3B but the eye piece lens $L_3$ is replaced with the modified eye piece lens $L_3'$. The modified eye piece lens $L_3'$ is formed with an rim-like lens extension as integral part. The image light rays of a reticle 26 located off the optical axis X between the objective lens $L_3$ and the movable lens $L_2$ are directed to the rim-like lens extension and introduced into the view of the view finder through repeated internal reflection by the rim-like lens extension.

In the above described embodiments, the shape of each lens element may be changed, and the number of plastic lens elements and the number of aspherical surfaces may be changes according to designs.

It is to be understood that the present invention may be embodied with various changes, modifications and improvements, which may occur to those skilled in the art, without departing from the spirit and scope of the invention defined in the following claims.

What is claimed is:

1. An inverted Galilean zoom finder lens system comprising in order from the object side to the image side a positive power objective lens, a negative power lens axially movable to change a zoom ratio of the zoom finder lens system, and a negative power eye piece lens having an object side concave surface, said zoom finder lens system satisfying the following conditions:

$$0.6 < R_5/R_6 < 0.9$$

$$-1.8 < d_5/R_5 < -1.4$$

where $R_5$ the radius of paraxial curvature of the object side surface of the eye piece lens;

$R_6$ is the radius of paraxial curvature of the image side surface of the eye piece lens; and $d_5$ is the axial distance between the object side surface and the image side surface of the eye piece lens.

2. An inverted Galilean zoom finder lens system as defined in claim 1, and further comprising a reticle formed with a framing mark, said reticle being located on an object side of said eye piece lens.

3. An inverted Galilean zoom finder lens system as defined in claim 2, and further comprising a framing mark projection optical system for projecting an image of said framing mark into a view of said zoom finder lens system, said framing mark projection optical system comprising said object side surface made half transparent of said eye piece lens and a reflective surface outside a transparent surface of said image side surface which light rays from a visual field pass through so that said image of said framing mark is reflected back by said reflective surface of said image side surface and is subsequently reflected and directed by said half transparent object side surface into a view of said zoom finder lens system.

4. An inverted Galilean zoom finder lens system as defined in claim 3, wherein said reflective surface of said image side surface of said eye piece lens is formed as a spherical surface having a is center of curvature radius on an axis of said zoom finder lens system.

5. An inverted Galilean zoom finder lens system as defined in claim 4, wherein said framing mark projection optical system includes at least two reflective surfaces formed at said image side surface of said eye piece lens which reflect said image of said framing mark into a view of said zoom finder lens system.

6. An inverted Galilean zoom finder lens system as defined in claim 4, and further comprising dioptric compensation means for adjusting a diopter of said framing mark projection optical system which is located in an optical axis of said framing mark projection optical system before said reflective surface of said image side surface by which said image of said framing mark is reflected back.

7. An inverted Galilean zoom finder lens system as defined in claim 5, and further comprising dioptric compensation means for adjusting a diopter of said framing mark projection optical system which is located in an optical axis of said framing mark projection optical system before said reflective surface of said image side surface by which said image of said framing mark is reflected back.

8. An inverted Galilean zoom finder lens system as defined in claim 3, wherein said reflective surface of said image side surface of said eye piece lens is formed as an aspherical surface having a center of paraxial curvature radius on an axis of said zoom finder lens system.

9. An inverted Galilean zoom finder lens system as defined in claim 8, wherein said framing mark projection optical system includes at least two reflective surfaces formed at said image side surface of said eye piece lens which reflect said image of said framing mark into a view of said zoom finder lens system.

10. An inverted Galilean zoom finder lens system as defined in claim 8, and further comprising dioptric compensation means for adjusting a diopter of said framing mark projection optical system which is located in an optical axis of said framing mark projection optical system before said reflective surface of said image side surface by which said image of said framing mark is reflected back.

11. An inverted Galilean zoom finder lens system as defined in claim 9, and further comprising dioptric compensation means for adjusting a diopter of said framing mark projection optical system which is located in an optical axis of said framing mark projection optical system before said reflective surface of said image side surface by which said image of said framing mark is reflected back.

12. An inverted Galilean zoom finder lens system as defined in claim 3, wherein said framing mark projection optical system includes at least two reflective surfaces formed at said image side surface of said eye piece lens which reflect said image of said framing mark into a view of said zoom finder lens system.

13. An inverted Galilean zoom finder lens system as defined in claim 12, and further comprising dioptric compensation means for adjusting a diopter of said framing mark projection optical system which is located in an optical axis of said framing mark projection optical system before said reflective surface of said image side surface by which said image of said framing mark is reflected back.

14. An inverted Galilean zoom finder lens system as defined in claim 3, and further comprising dioptric compensation means for adjusting a diopter of said framing mark projection optical system which is located in an optical axis of said framing mark projection optical system before said reflective surface of said image side surface by which said image of said framing mark is reflected back.

15. An inverted Galilean zoom finder lens system as defined in claim 1, as described:

| Lens | Surface Radius (mm) | Axial Distance (mm) | $N_d$ | $\underline{v_d}$ |
|---|---|---|---|---|
| $L_1$ | S1 $R_1$ = 14.763 | $d_1$ = 5.00 | 1.49023 | 57.6 |
|  | S1 $R_2$ = −53.288 | $d_2$ = Variable |  |  |
| $L_2$ | S2 $R_3$ = −45.959 | $d_3$ = 1.80 | 1.49023 | 57.6 |
|  | S3 $R_4$ = 4.045 | $d_4$ = Variable |  |  |
| $L_3$ | S4 $R_5$ = −4.185 | $d_5$ = 6.50 | 1.49023 | 57.6 |
|  | S5 $R_6$ = −5.226 | $d_6$ = 14.50 |  |  |
| E.P. |  |  |  |  | wherein the zoom finder lens system comprises lenses $L_1$ to $L_3$ having surfaces $S_1$ to $S_6$ which have lens surface radii $R_1$ to $R_6$, respectively, E.P. is an eye point of the zoom finder optical system, $d_1$ to $d_6$ are axial distance between adjacent lens surfaces and the surface $S_6$ and the eye point, the index of refraction of the lens is given by $N_d$, the dispersion of the lens is measured by the Abbe number $v_d$.

16. An inverted Galilean zoom finder lens system as defined in claim 15, wherein said surfaces $S_1$, $S_4$ and $S_6$ comprise aspherical surfaces, respectively, defined by the following equation and as described:

$$Z=Ch^2/\{1+(1-KC^2h^2)^{1/2}\}+a_2h^4+a_3h^6+a_4h^8+a_5h^{10}$$

|  | $S_1$ | $S_4$ | $S_6$ |
|---|---|---|---|
| $a_2$ | −1.0586 × 10$^{-4}$ | 9.7629 × 10$^{-5}$ | 3.2515 × 10$^{-4}$ |
| $a_3$ | 2.5983 × 10$^{-7}$ | 4.7558 × 10$^{-5}$ | −4.1631 × 10$^{-7}$ |
| $a_4$ | −1.8627 × 10$^{-9}$ | −9.7501 × 10$^{-7}$ | 1.1921 × 10$^{-7}$ |
| $a_5$ | 1.3000 × 10$^{-13}$ | 0 | 4.5462 × 10$^{-9}$ |
| K | 1.0664 | −0.3319 | 0.7447 |
| C | 0.067737 | 0.247219 | −0.191351 | wherein Z is the surface sag at a semi-aperture distance h from the axis of the finder lens system, C is the paraxial curvature of a lens surface at the optical axis X, K is a conic constant, and $a_2$, $a_3$, $a_4$ and $a_5$ are aspherical coefficients.

17. An inverted Galilean zoom finder lens system as defined in claim 1, as described:

| Lens | Surface Radius (mm) | Axial Distance (mm) | $N_d$ | $\underline{v_d}$ |
|---|---|---|---|---|
| $L_1$ | $S_{1\,R1}$ = 20.687 | $d_1$ = 7.50 | 1.49023 | 57.6 |
|  | $S_{2\,R2}$ = −39.254 | $d_2$ = Variable |  |  |
| $L_2$ | $S_{3\,R3}$ = −30.475 | $d_3$ = 2.38 | 1.49023 | 57.6 |
|  | $S_{4\,R4}$ = 5.472 | $d_4$ = Variable |  |  |
| $L_3$ | $S_{5\,R5}$ = −4.870 | $d_5$ = 7.37 | 1.49023 | 57.6 |
|  | $S_{6\,R6}$ = −6.136 | $d_2$ = 14.50 |  |  |
| E.P. |  |  |  |  | wherein the zoom finder lens system comprises lenses $L_1$ to $L_3$ having surfaces $S_1$ to $S_6$ which have lens surface radii $R_1$ to $R_6$, respectively, E.P. is an eye point of the zoom finder optical system, $d_1$ to $d_6$ are axial distance between adjacent lens surfaces and the surface $S_6$ and the eye point, the index of refraction of the lens is given by $N_d$, the dispersion of the lens is measured by the Abbe number $v_d$.

18. An inverted Galilean zoom finder lens system as defined in claim 17, wherein said surfaces $S_1$, $S_4$ and $S_6$ defined by the following equation and as described:

$$Z=Ch^2/\{1+(1-KC^2h^2)^{1/2}\}+a_2h^4+a_3h^6+a_4h^8+a_5h^{10}$$

|  | $S_1$ | $S_2$ | $S_6$ |
|---|---|---|---|
| $a_2$ | −2.02910 × 10$^{-5}$ | −1.54711 × 10$^{-3}$ | 3.29853 × 10$^{-4}$ |
| $a_3$ | 8.84260 × 10$^{-8}$ | 4.64842 × 10$^{-5}$ | −3.79208 × 10$^{-6}$ |
| $a_4$ | −2.93717 × 10$^{-10}$ | −9.67381 × 10$^{-7}$ | 7.81053 × 10$^{-8}$ |
| $a_5$ | 0 | 0 | 0 |
| K | −1.98560 | 0.61429 | 0.88445 |
| C | 0.0483395 | 0.1827485 | −0.1629726 | wherein Z is the surface sag at a semi-aperture distance h from the axis of the finder lens system, C is the paraxial curvature of a lens surface at the optical axis X, K is a conic constant, and $a_2$, $a_3$, $a_4$ and $a_5$ are aspherical coefficients.

19. An inverted Galilean zoom finder lens system as defined in claim 1, as described:

| Lens | Surface Radius (mm) | Axial Distance (mm) | $N_d$ | $\underline{v_d}$ |
|---|---|---|---|---|
| $L_1$ | $S_1\ R_1$ = 14.657 | $d_1$ = 5.70 | 1.49023 | 57.6 |
|  | $S_2\ R_2$ = −40.177 | $d_2$ = Variable |  |  |
| $L_2$ | $S_3\ R_3$ = −29.162 | $d_3$ = 1.80 | 1.49023 | 57.6 |
|  | $S_4\ R_4$ = 4.352 | $d_4$ = Variable |  |  |
| $L_3$ | $S_5\ R_5$ = −5.314 | $d_5$ = 8.98 | 1.49023 | 57.6 |
|  | $S_6\ R_6$ = −6.680 | $d_6$ = 14.50 |  |  |
| E.P. |  |  |  |  | wherein the zoom finder lens system comprises lenses $L_1$ to $L_3$ having surfaces $S_1$ to $S_6$ which have lens surface radii $R_1$ to $R_6$, respectively, E.P. is an eye point of the zoom finder optical system, $d_1$ to $d_6$ are axial distance between adjacent lens surfaces and the surface $S_6$ and the eye point, the index of refraction of the lens is given by $N_d$, the dispersion of the lens is measured by the Abbe number $v_d$.

20. An inverted Galilean zoom finder lens system as defined in claim 19, wherein said surfaces $S_1$, $S_4$ and $S_6$ defined by the following equation and as described:

$$Z=Ch^2/\{1+(1-KC^2h^2)^{1/2}\}+a_2h^4+a_3h^6+a_4h^8+a_5h^{10}$$

|  | $S_1$ | $S_4$ | $S_6$ |
|---|---|---|---|
| $a_2$ | −1.1049 × 10$^{-4}$ | −1.5749 × 10$^{-4}$ | 3.0703 × 10$^{-4}$ |
| $a_3$ | 2.7705 × 10$^{-7}$ | 4.1999 × 10$^{-5}$ | −3.9041 × 10$^{-6}$ |
| $a_4$ | −2.0840 × 10$^{-9}$ | −9.6928 × 10$^{-7}$ | 6.1240 × 10$^{-8}$ |
| $a_5$ | 1.3000 × 10$^{-13}$ | 5.8965 × 10$^{-19}$ | 3.8142 × 10$^{-9}$ |
| K | 0.9686 | −0.5484 | 0.8642 |
| C | 0.068227 | 0.229779 | −0.149701 | wherein Z is the surface sag at a semi-aperture distance h from the axis of the finder lens system, C is the paraxial curvature of a lens surface at the optical axis X, K is a conic constant, and $a_2$, $a_3$, $a_4$ and $a_5$ are aspherical coefficients.

21. An inverted Galilean zoom finder lens system as defined in claim 16, and further comprising a reticle formed with a framing mark located on an object side of said eye piece lens and a framing mark projection optical system for projecting an image of said framing mark into a view of said zoom finder lens system, said framing mark projection optical system which comprises said object side surface made half transparent which light rays from a visual field pass through, a transparent surface formed around said object side surface, and a reflective surface formed around said image side surface, said reflective surface reflects back an image of said framing mark incident onto said transparent surface toward said object side surface so as to reflect said image of said framing mark into a view of said zoom finder lens system, said framing mark projection optical system described as:

| Lens | Surface Radius (mm) | Axial Distance (mm) | $N_d$ | $\nu_d$ |
|---|---|---|---|---|
| E.P. | | | | |
| | | $d_6 =$ 14.50 | | |
| | $S_6$* $R_6 =$ −5.226 | | | |
| | | $d_5 =$ 6.50 | 1.49023 | 57.6 |
| | $S_5$ $R_5 =$ 4.185 | | | |
| $L_3'$ | | $d_7 =$ −6.50 | −1.49023 | 57.6 |
| | $S_8$* $R_8 =$ 16.500 | | | |
| | | $d_8 =$ 7.9 | 1.49023 | 57.6 |
| | $S_7$ $R_7 =$ ∞ | | | | wherein the framing mark projection system comprises an eye piece lens $L_3'$ formed with said transparent surface $S_7$ and said reflective surface $S_8$ which have lens surface radii $R_7$ and $R_8$, respectively, positive surface radii are struck from the object side, and the negative distance is measured from the image side to the object side.

22. An inverted Galilean zoom finder lens system as defined in claim 21, wherein said surface $S_8$ comprises an aspherical surface defined by the following equation and as described:

$$Z=Ch^2/\{1+(1-KC^2h^2)^{1/2}\}+a_2h^4+a_3h^6+a_4h^8+a_5h^{10}$$

| | Aspherical Surface S6 and S8 Aspherical Coefficients: | |
|---|---|---|
| | $S_6$ | $S_8$ |
| $a_2$ | −3.2515 × 10⁻⁴ | −1.9887 × 10⁻⁵ |
| $a_3$ | 4.1631 × 10⁻⁷ | 3.5151 × 10⁻⁹ |
| $a_4$ | −1.1921 × 10⁻⁷ | −6.3754 × 10⁻¹⁰ |
| $a_5$ | −4.5462 × 10⁻⁹ | 1.1992 × 10⁻¹³ |
| Conic Constant: | | |
| K | 0.7447 | 1.0508 |
| Paraxial Curvature: | | |
| C | 0.191351 | 0.060606 | wherein Z is the surface sag at a semi-aperture distance h from the axis of the finder lens system, C is the paraxial curvature of a lens surface at the optical axis X, K is a conic constant, and $a_2$, $a_3$, $a_4$ and $a_5$ are aspherical coefficients.

23. An inverted Galilean zoom finder lens system as defined in claim 20, and further comprising a reticle formed with a framing mark located on an object side of said eye piece lens and a framing mark projection optical system for projecting an image of said framing mark into a view of said zoom finder lens system, said framing mark projection optical system which comprises said object side surface made half transparent which light rays from a visual field pass through, a transparent surface formed around said object side surface, and a reflective surface formed around said image side surface, said reflective surface reflects back an image of said framing mark incident onto said transparent surface toward said object side surface so as to reflect said image of said framing mark into a view of said zoom finder lens system, said framing mark projection optical system described as:

| Lens | Surface Radius (mm) | Axial Distance (mm) | $N_d$ | $\nu_d$ |
|---|---|---|---|---|
| E.P. | | | | |
| | | $d_6 =$ 14.50 | | |
| | $S_6$* $R_6 =$ 6.680 | | | |
| | | $d_5 =$ 8.981 | 1.49023 | 57.6 |
| | $S_5$ $R_5 =$ 5.314 | | | |
| $L_3'$ | | $d_8 =$ −8.981 | −1.49023 | 57.6 |
| | $S_8$* $R_8 =$ 18.829 | | | |
| | | $d_7 =$ 17.800 | 1.49023 | 57.6 |
| | $S_7$ $R_7 =$ ∞ | | | | wherein the framing mark projection system comprises an eye piece lens $L_3'$ formed with said transparent surface $S_7$ and said reflective surface $S_8$ which have lens surface radii $R_7$ and $R_8$, respectively, positive surface radii are struck from the object side, and the negative distance is measured from the image side to the object side.

24. An inverted Galilean zoom finder lens system as defined in claim 21, wherein said surface $S_8$ comprises an aspherical surface defined by the following equation and as described:

$$Z=Ch^2/\{1+(1-KC^2h^2)^{1/2}\}+a_2h^4+a_3h^6+a_4h^8+a_5h^{10}$$

| | Aspherical Surface S6 and S8 Aspherical Coefficients: | |
|---|---|---|
| | $S_6$ | $S_8$ |
| $a_2$ | −3.0703 × 10⁻⁴ | −5.7433 × 10⁻⁶ |
| $a_3$ | 3.9041 × 10⁻⁶ | −7.6862 × 10⁻⁹ |
| $a_4$ | −6.1240 × 10⁻⁸ | −2.7537 × 10⁻¹¹ |
| $a_5$ | −3.8142 × 10⁻⁹ | 2.5291 × 10⁻¹³ |
| Conic Constant: | | |
| K | 1.0156 | 0.8642 |
| Paraxial Curvature: | | |
| C | 0.053110 | 0.149701 | wherein the framing mark projection system comprises an eye piece lens $L_3'$ formed with said transparent surface $S_7$ and said reflective surface $S_8$ which have lens surface radii $R_7$ and $R_8$, respectively, $d_5'$ is an axial distance between said transparent surface $S_7$ and said reflective surface $S_8$.

* * * * *